United States Patent
Miyahara et al.

(10) Patent No.: US 10,086,845 B2
(45) Date of Patent: Oct. 2, 2018

(54) VEHICLE INFORMATION DISPLAY CONTROL DEVICE, AND METHOD FOR DISPLAYING AUTOMATIC DRIVING INFORMATION

(71) Applicant: MITSUBISHI ELECTRIC CORPORATION, Tokyo (JP)

(72) Inventors: Tadashi Miyahara, Tokyo (JP); Mitsuo Shimotani, Tokyo (JP); Satoru Inoue, Tokyo (JP); Yoshio Sato, Tokyo (JP); Yuki Sakai, Tokyo (JP); Yuji Karita, Tokyo (JP); Yohei Akashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/749,748

(22) PCT Filed: Oct. 30, 2015

(86) PCT No.: PCT/JP2015/080733
§ 371 (c)(1),
(2) Date: Feb. 1, 2018

(87) PCT Pub. No.: WO2017/072953
PCT Pub. Date: May 4, 2017

(65) Prior Publication Data
US 2018/0222491 A1     Aug. 9, 2018

(51) Int. Cl.
*B60W 50/14* (2012.01)
*G07C 5/12* (2006.01)
(Continued)

(52) U.S. Cl.
CPC ............. *B60W 50/14* (2013.01); *B60K 35/00* (2013.01); *G02B 27/0101* (2013.01); *G07C 5/12* (2013.01);
(Continued)

(58) Field of Classification Search
CPC . B60W 50/14; B60W 2050/146; B60K 35/00; B60K 2350/1068; B60K 2350/108;
(Continued)

(56) References Cited

U.S. PATENT DOCUMENTS 8,818,608 B2 * 8/2014 Cullinane ............. B60W 30/00 701/23
9,442,484 B2 * 9/2016 Park ..................... G05D 1/0061
(Continued)

FOREIGN PATENT DOCUMENTS

JP   2003-214536 A   7/2003
JP   2005-201432 A   7/2005
(Continued)

*Primary Examiner* — Nay Tun
(74) *Attorney, Agent, or Firm* — Birch, Stewart, Kolasch & Birch, LLP

(57) ABSTRACT

A vehicle information display control device includes: an automatic driving information obtaining unit that obtains automatic driving information including information indicating that each actuator of a vehicle is in a manual control mode or an automatic control mode; and a display controller that displays images on a first display area and a second display area of a display based on the automatic driving information. The display controller displays an image corresponding to an actuator in the manual control mode on the first display area and an image corresponding to an actuator in the automatic control mode on the second display area.

8 Claims, 22 Drawing Sheets

(51) Int. Cl.
*B60K 35/00* (2006.01)
*G02B 27/01* (2006.01)

(52) U.S. Cl.
CPC .............. *B60K 2350/108* (2013.01); *B60K 2350/1068* (2013.01); *B60K 2350/1096* (2013.01); *B60W 2050/146* (2013.01); *G02B 2027/014* (2013.01); *G02B 2027/0141* (2013.01)

(58) Field of Classification Search
CPC ........ B60K 2350/1096; G02B 27/0101; G02B 2027/014; G02B 2027/0141; G07C 5/12
See application file for complete search history.

(56) References Cited

U.S. PATENT DOCUMENTS

| | | | |
|---|---|---|---|
| 9,694,681 B2 * | 7/2017 | Kleen | B60W 50/14 |
| 9,827,854 B2 * | 11/2017 | Lee | B60K 35/00 |
| 2012/0008048 A1 * | 1/2012 | Sekine | G06T 19/006 |
| | | | 348/566 |
| 2014/0141934 A1 * | 5/2014 | Yamaguchi | B60K 6/445 |
| | | | 477/111 |
| 2014/0156133 A1 * | 6/2014 | Cullinane | B60W 30/00 |
| | | | 701/23 |
| 2015/0015964 A1 * | 1/2015 | Takasu | G02B 27/0101 |
| | | | 359/630 |
| 2016/0121907 A1 * | 5/2016 | Otake | B60W 50/14 |
| | | | 701/23 |
| 2016/0170485 A1 | 6/2016 | Naruse | |
| 2016/0179092 A1 * | 6/2016 | Park | G05D 1/0061 |
| | | | 701/23 |
| 2016/0214483 A1 * | 7/2016 | Kleen | B60W 50/14 |

FOREIGN PATENT DOCUMENTS

| | | |
|---|---|---|
| JP | 2006-142944 A | 6/2006 |
| JP | 2012-32811 A | 2/2012 |
| JP | 2014-218199 A | 11/2014 |
| JP | 2015-16769 A | 1/2015 |
| JP | 2015-24746 A | 2/2015 |

\* cited by examiner

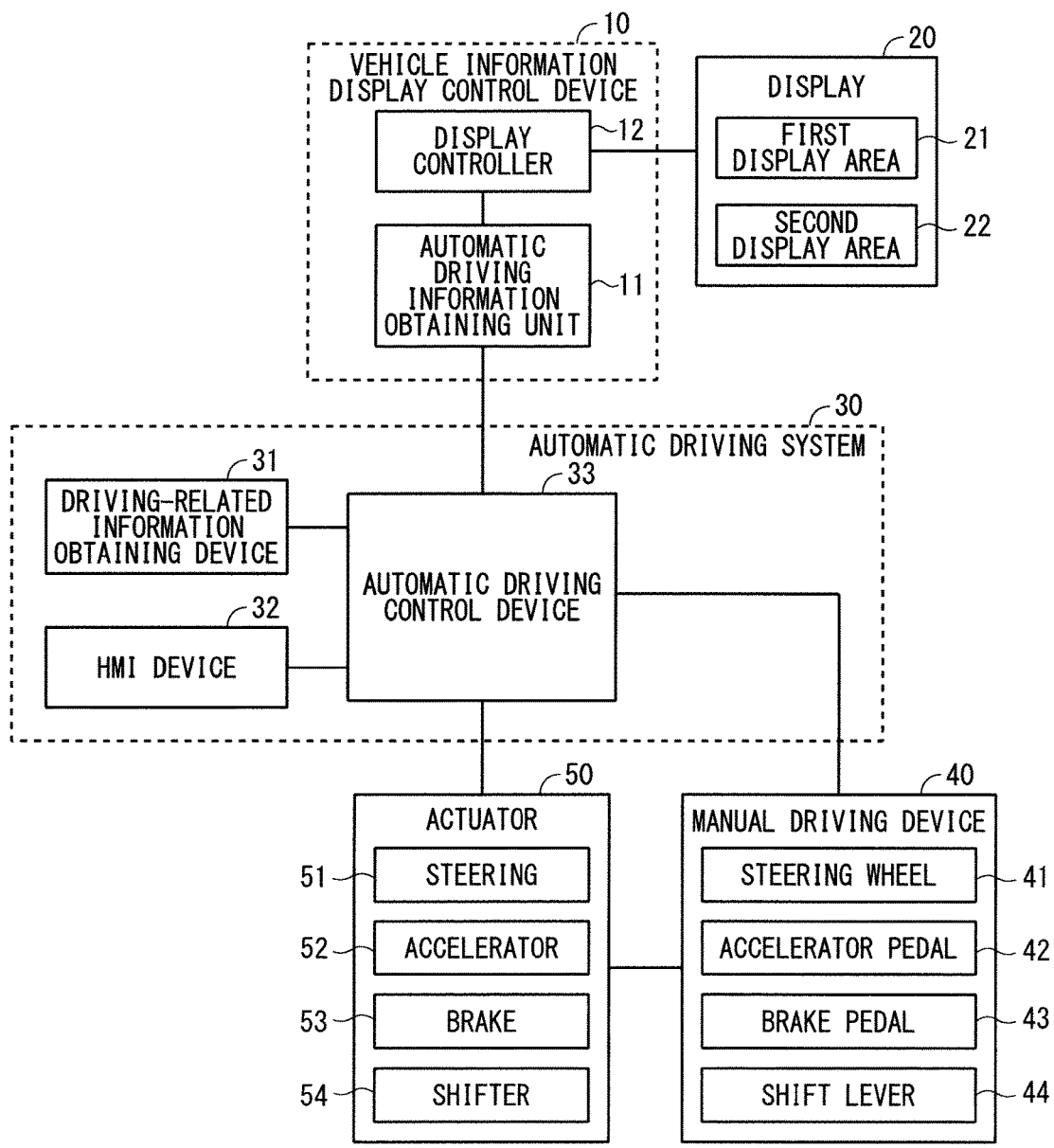
F I G . 1

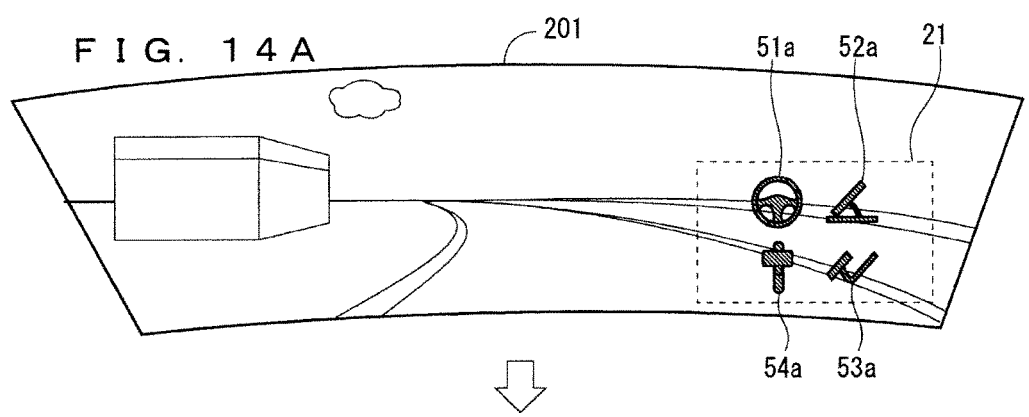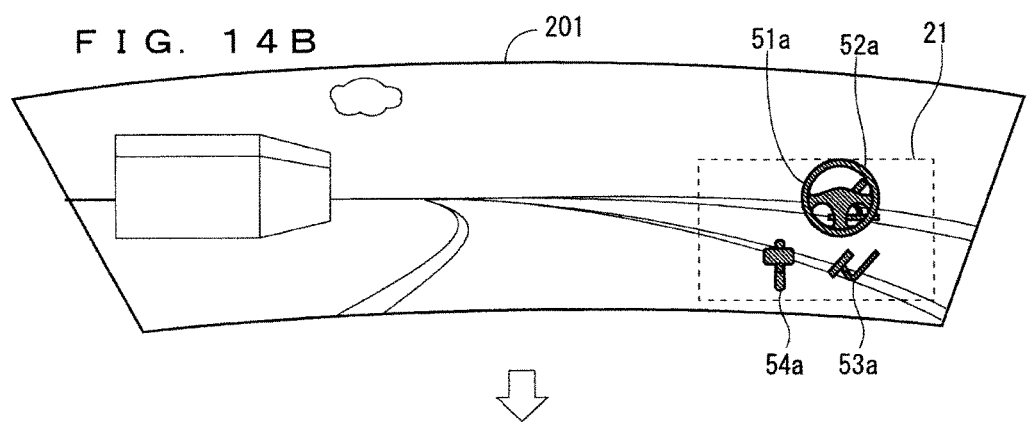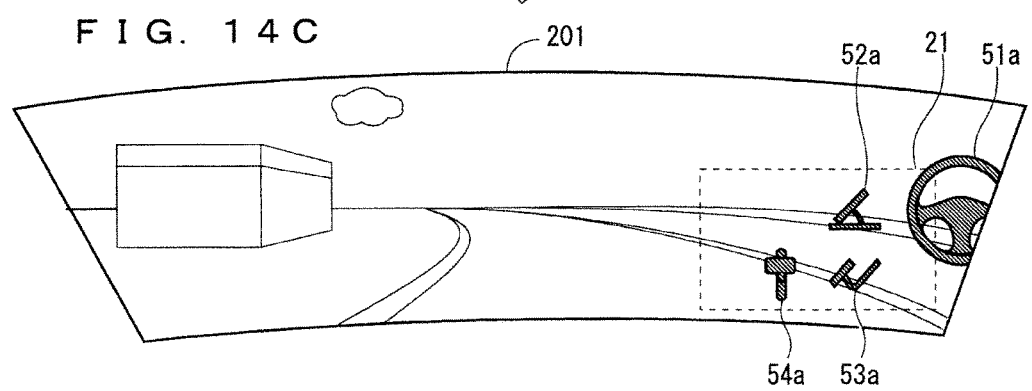

F I G. 1 5
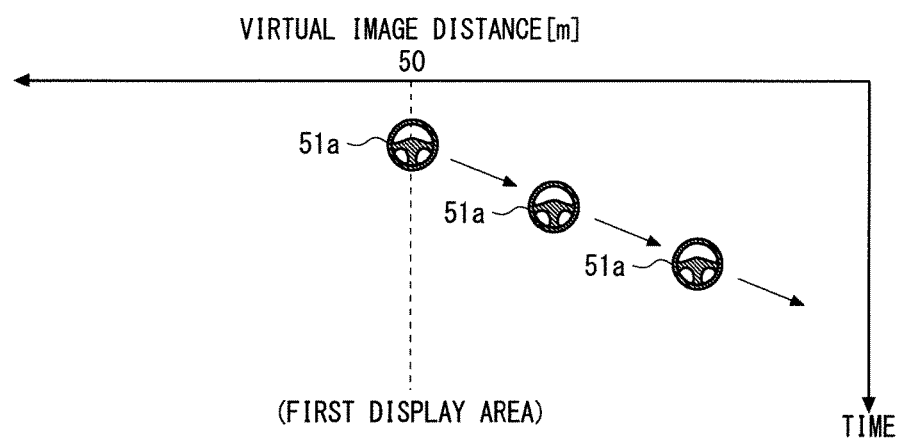
F I G. 1 6
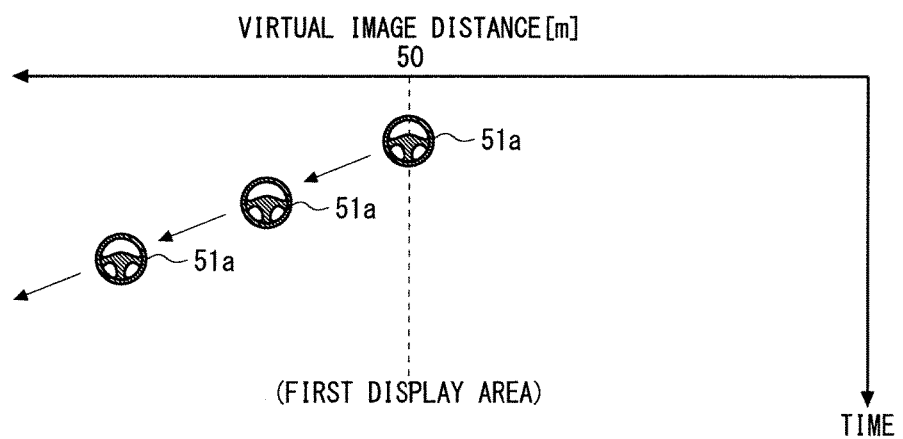

F I G . 1 7
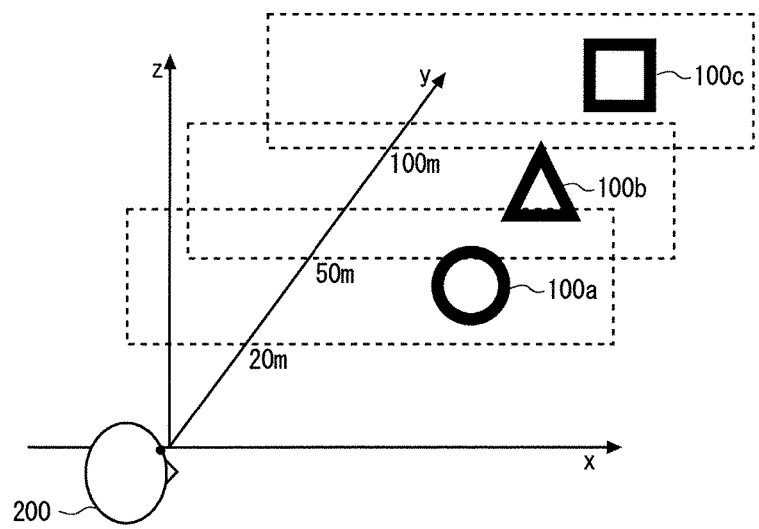
F I G . 1 8
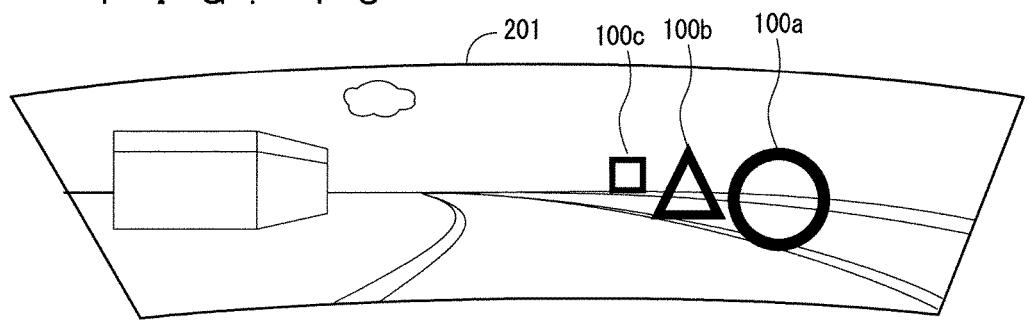
F I G . 1 9
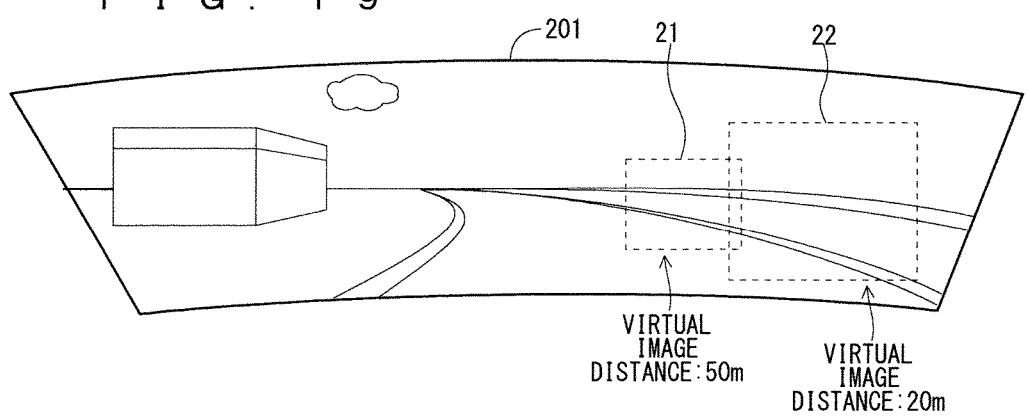

F I G . 3 0
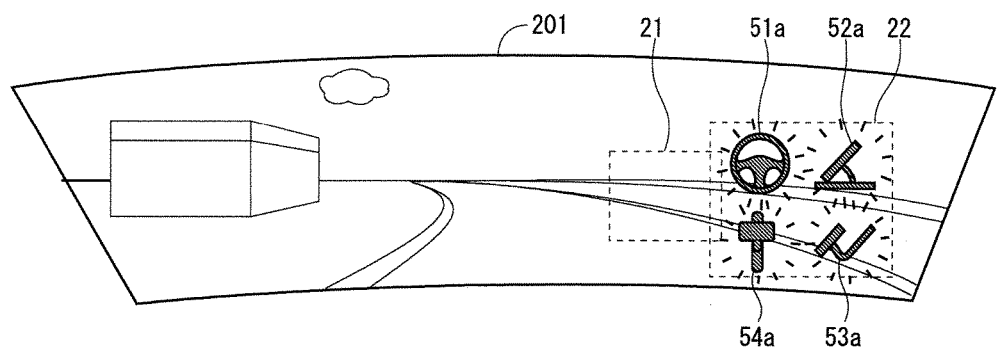
F I G . 3 1
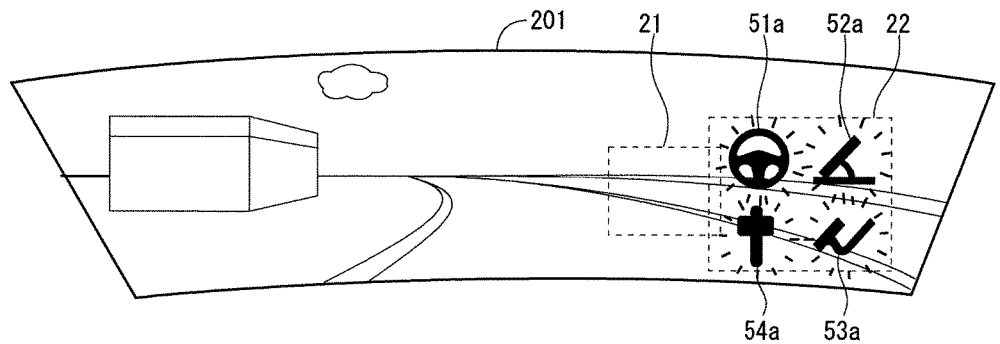

US 10,086,845 B2

VEHICLE INFORMATION DISPLAY CONTROL DEVICE, AND METHOD FOR DISPLAYING AUTOMATIC DRIVING INFORMATION

TECHNICAL FIELD

The present invention relates to a vehicle information display control device, and particularly to a method for displaying automatic driving information.

BACKGROUND ART

For example, Patent Document 1 below discloses a technique for presenting levels of automation to a driver in switching a manual driving mode of a vehicle to an automatic driving mode stepwise to resolve the discomfort of the driver in the automatic driving mode.

PRIOR ART DOCUMENTS

Patent Documents

Patent Document 1: Japanese Patent Application Laid-Open No. 2015-24746

SUMMARY

Problem to be Solved by the Invention

In Patent Document 1, the levels of automation to be presented to the driver are represented by numerical values such as 1, 2, and 3. Although the driver can roughly understand a degree (percentage) of the automation, the driver has difficulties in understanding, among actuators of the vehicle (for example, a steering, an accelerator, a brake, and a shifter), which one is automatically controlled and which one is manually controlled.

The present invention has been conceived to solve such a problem, and has an object of providing a vehicle information display control device that allows the driver to easily understand a control mode (an automatic control mode or a manual control mode) of each of the actuators.

Means to Solve the Problem

A vehicle information display control device according to the present invention includes: an automatic driving information obtaining unit to obtain automatic driving information including information indicating that each actuator of a vehicle is in a manual control mode or an automatic control mode; and a display controller to cause a display to display an image based on the automatic driving information, wherein the display includes a first display area and a second display area, and the display controller causes the display to display an image corresponding to an actuator in the manual control mode on the first display area, and an image corresponding to an actuator in the automatic control mode on the second display area.

Effects of the Invention

Since the vehicle information display control device according to the present invention sorts the image corresponding to each of the actuators according to a control mode of the actuator and displays each of the images on one of the first display area and the second display area, the driver can easily understand the control mode of each of the actuators from an area on which the image corresponding to the actuator is displayed.

The object, features, aspects and advantages of this invention will become more apparent from the following detailed description and the accompanying drawings.

BRIEF DESCRIPTION OF DRAWINGS

FIG. 1 is a block diagram illustrating a configuration of a driving assistance system according to Embodiment 1 of the present invention.

FIGS. 14A to 14C illustrate an example display change in the automatic driving information.

FIG. 15 illustrates an example display change in the automatic driving information.

FIG. 16 illustrates an example display change in the automatic driving information.

FIG. 17 illustrates the HUD that can change a virtual image distance.

FIG. 18 illustrates the HUD that can change the virtual image distance.

FIG. 19 illustrates the first display area and the second display area according to Embodiment 2.

FIG. 30 illustrates a display example of the automatic driving information.

FIG. 31 illustrates a display example of the automatic driving information.

DESCRIPTION OF EMBODIMENTS

[Embodiment 1]

Figure 2:
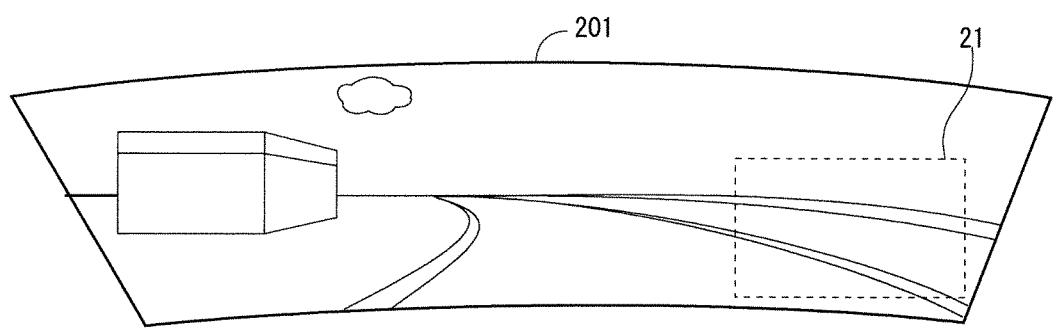
FIG. 2 illustrates a first display area according to Embodiment 1.

FIG. 1 is a block diagram illustrating a configuration of a driving assistance system according to Embodiment 1 of the present invention.

As illustrated in FIG. 1, the driving assistance system includes a vehicle information display control device 10, a display 20, an automatic driving system 30, a manual driving device 40, and an actuator 50. Hereinafter, a vehicle equipped with the driving assistance system will be referred to as a "subject vehicle".

The actuator 50 is a device for controlling traveling of the subject vehicle, and includes a plurality of elements such as a steering 51, an accelerator 52 (throttle), a brake 53, and a shifter 54 (gear) (each of these elements may be referred to as an "actuator"). Besides, the actuator 50 may include lighting devices such as a head lamp and a blinker.

The manual driving device 40 is a device allowing the driver to control the actuator 50 through a manual operation, and includes a steering wheel 41 for operating the steering 51, an accelerator pedal 42 for operating the accelerator 52, a brake pedal 43 for operating the brake 53, and a shift lever 44 for operating the shifter 54 (each of these elements may be referred to as a "manual driving device"). Besides, the manual driving device 40 may include operation devices for the lighting devices.

The automatic driving system 30 is a system for automatically controlling the actuator 50, and includes a driving-related information obtaining device 31, a Human-Machine Interface (HMI) device 32, and an automatic driving control device 33.

The driving-related information obtaining device 31 includes various sensors and a communication device, and obtains various pieces of information related to the driving of the subject vehicle (driving-related information). Examples of the driving-related information include information on obstructions around the subject vehicle (for example, pedestrians, the other vehicles, and features), map information, information on the current position of the subject vehicle, information on a planned travel route of the subject vehicle, traffic information (for example, traffic jam information and construction information), and information indicating a state of the driver (for example, an arousal level, a gaze point, and a limb position).

The HMI device 32 is a user interface for the driver of the subject vehicle to input an instruction to the automatic driving control device 33, and for the automatic driving control device 33 to present the various pieces of information to the driver. Input means of the HMI device 32 may be pieces of hardware such as an operation button, a keyboard, and a remote control switch, or a software key using a button (icon) displayed on a screen. Means for outputting information include a display and an audio output device. When a software key functioning as the input means is displayed on a display functioning as the output means, the HMI device 32 may be configured as a touch panel.

The automatic driving control device 33 automatically controls the actuator 50 based on the driving-related information obtained by the driving-related information obtaining device 31 and the instruction of the driver input to the HMI device 32.

Hereinafter, a control mode in which the automatic driving system 30 (the automatic driving control device 33) automatically controls the actuator 50 will be referred to as an "automatic control mode", and a control mode in which the actuator 50 is controlled by a manual operation of the driver using the manual driving device 40 will be referred to as a "manual control mode". Each of the elements of the actuator 50 is set to a control mode. For example, only the steering 51 may be set to the automatic control mode, whereas the accelerator 52, the brake 53, and the shifter 54 may be set to the manual control mode.

The vehicle information display control device 10 includes an automatic driving information obtaining unit 11 and a display controller 12. The automatic driving information obtaining unit 11 obtains automatic driving information from the automatic driving control device 33. The automatic driving information includes information at least indicating that each of the actuators (the steering 51, the accelerator 52, the brake 53, and the shifter 54) of the subject vehicle is in the manual control mode or the automatic control mode. The display controller 12 causes the display 20 to display an image based on the automatic driving information obtained by the automatic driving information obtaining unit 11.

The display 20 includes a first display area 21 and a second display area 22 as display screens of images. The first display area 21 and the second display area 22 may be two independent screens, or may be disposed in one screen. Although the display 20 is represented by one block in FIG. 1, a display including the first display area 21 and a display including the second display area 22 may be separately provided.

The display controller 12 sorts an image corresponding to each of the actuators according to a control mode of the actuator, and displays the image on the first display area 21 or the second display area 22 of the display 20. Specifically, the display controller 12 displays an image corresponding to the actuator in the manual control mode on the first display area 21, and an image corresponding to the actuator in the automatic control mode on the second display area 22.

In Embodiment 1, the first display area 21 is implemented by a head up display (HUD), and the second display area 22 is implemented by a liquid crystal display (LCD).

The HUD that displays an image on the first display area 21 displays the image on a windshield of a vehicle, so that the image appears as a virtual image in the driver's vision. In other words, the first display area 21 according to Embodiment 1 becomes a partial area of a windshield 201 of the subject vehicle as illustrated in FIG. 2. The driver views the image (virtual image) displayed by the HUD as if it was in the space ahead of the subject vehicle.

Figure 3:
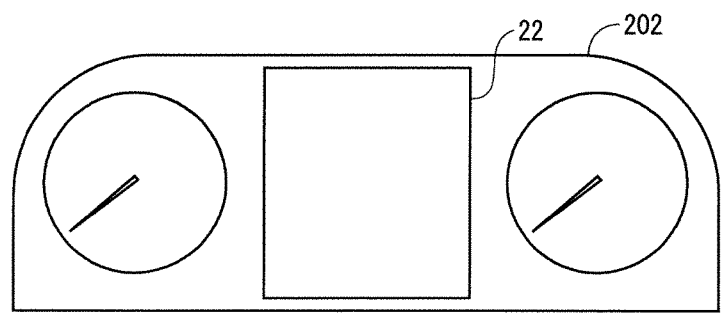
FIG. 3 illustrates a second display area according to Embodiment 1.

The LCD implemented as the second display area 22 is placed in a meter cluster 202 of the driver's seat as illustrated in FIG. 3. The position of the second display area 22 is not limited to this but may be any position that allows the driver to visually identify the second display area 22 with ease. The second display area 22 may be disposed, for example, in a center panel of a dash board (between the driver's seat and the front passenger seat).

Figure 4:
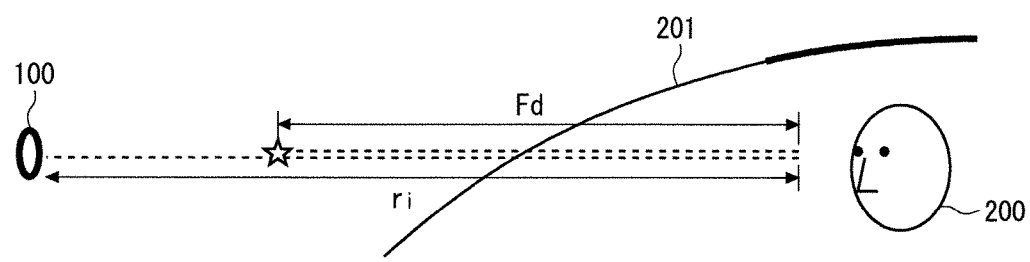
FIG. 4 illustrates operations of a head up display (HUD).

Here, an image (virtual image) displayed by the HUD will be described with reference to FIGS. 4 and 5. The HUD can display an image 100 as a virtual image in a visually identifiable position from the position of a driver 200 of the subject vehicle through the windshield 201 as illustrated in FIG. 4. Although the image 100 is actually displayed on the windshield 201, the driver 200 views the image 100 as if it was in the scenery ahead of the subject vehicle.

In the DESCRIPTION, an apparent display position of the image 100 when viewed from the driver 200 will be referred to as a "virtual image position". The virtual image position is defined by a virtual image direction that is a direction of the image 100 with respect to the position of the driver 200 and by a virtual image distance that is an apparent distance from the position of the driver 200 to the image 100. Although a reference point for defining the virtual image position is preferably the position of the driver 200, the reference point may be a specific position of the vehicle that can be regarded as the position of the driver 200, for example, the driver's seat, a specific point on the windshield 201, and a position near the driver's eye. The reference point may also be one point in a vehicle space which corresponds to a center point between the eyes of the driver. The center point has been estimated to design the position at which the HUD is to be installed.

Figure 5:
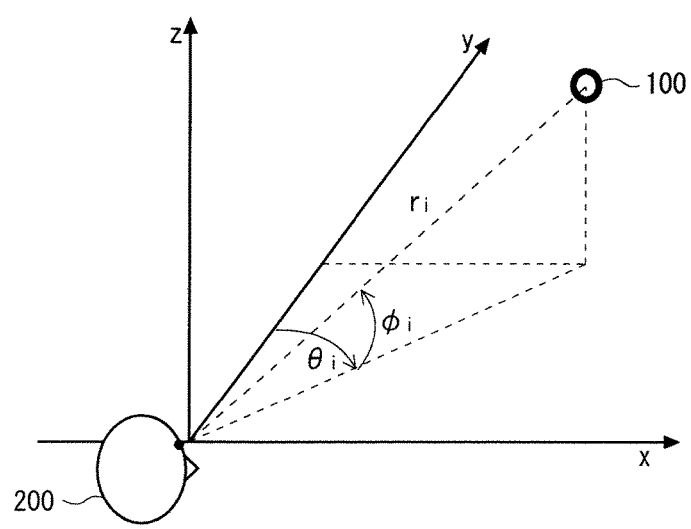
FIG. 5 illustrates operations of the HUD.

The virtual image direction is substantially equivalent to the position of the image 100 on the windshield 201 when viewed from the driver 200, and is represented by, for example, an angle ($\theta i$, $\phi i$) of a three-dimensional polar coordinate system as illustrated in FIG. 5. The virtual image distance is substantially equivalent to an apparent distance to the image 100 when viewed from the driver 200, and is represented by, for example, a radius vector (ri) of the three-dimensional polar coordinate system as illustrated in FIG. 5. The driver 200 can visually identify the image 100 in the virtual image position represented by the three-dimensional polar coordinates (ri, $\theta i$, $\phi i$) by adjusting a distance Fd of the focus of his/her eyes to the virtual image distance (ri).

Figure 6:
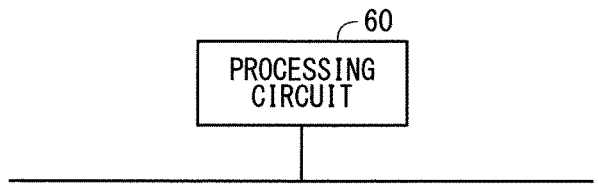
FIG. 6 illustrates an example hardware configuration of a vehicle information display control device.
Figure 7:
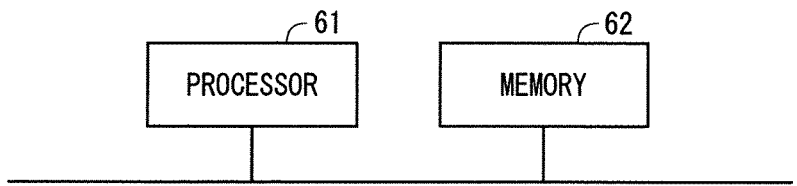
FIG. 7 illustrates an example hardware configuration of the vehicle information display control device.

FIGS. 6 and 7 each illustrate an example hardware configuration of the vehicle information display control device 10. The automatic driving information obtaining unit 11 and the display controller 12 of the vehicle information display control device 10 can be implemented by, for example, a processing circuit 60 illustrated in FIG. 6. In other words, the processing circuit 60 includes the automatic driving information obtaining unit 11 that obtains automatic driving information from the automatic driving system 30, and the display controller 12 that displays an image on each of the first display area 21 and the second display area 22 of the display 20 based on the automatic driving information. This processing circuit 60 may be dedicated hardware, or a processor (a central processing unit, a CPU, a processing unit, an arithmetic unit, a microprocessor, a microcomputer, or a digital signal processor) that executes a program stored in a memory.

When the processing circuit 60 is dedicated hardware, examples of the processing circuit 60 include a single circuit, a composite circuit, a programmed processor, a parallel-programmed processor, an ASIC, a FPGA, and any combination of these. Each of the functions of the automatic driving information obtaining unit 11 and the display controller 12 may be implemented by a plurality of the processing circuits 60 or by the one processing circuit 60 collectively.

FIG. 7 illustrates a hardware configuration of the vehicle information display control device 10 when a processor is configured as the processing circuit 60. The functions of the automatic driving information obtaining unit 11 and the display controller 12 are implemented by any combinations with software (software, firmware, or the software and the firmware). For example, the software is described as a program, and stored in a memory 62. A processor 61 functioning as the processing circuit 60 implements the functions of each of the unit and the controller by reading and executing the program stored in the memory 62. In other words, the vehicle information display control device 10 includes the memory 62 for storing a program which, when executed by the processing circuit 60, consequently executes the steps of: obtaining automatic driving information from the automatic driving system 30; and displaying an image on each of the first display area 21 and the second display area 22 of the display 20 based on the automatic driving information. Put it differently, this program causes a computer to execute procedures or methods of the automatic driving information obtaining unit 11 and the display controller 12.

Here, examples of the memory 62 include: non-volatile or volatile semiconductor memories such as a random access memory (RAM), a read only memory (ROM), a flash memory, an erasable programmable read only memory (EPROM), and an electrically erasable programmable read only memory (EEPROM); and a hard disk drive (HDD), a magnetic disk, a flexible disk, an optical disk, a compact disk, a mini disk, and a digital versatile disc (DVD) and their drive devices.

The configuration for implementing each of the functions of the automatic driving information obtaining unit 11 and the display controller 12 by, for example, one of software and hardware is described above. The configuration is not limited to such, but part of the automatic driving information obtaining unit 11 and the display controller 12 may be implemented by dedicated hardware or another part thereof may be implemented by, for example, software. For example, a processing circuit that is dedicated hardware can implement the functions of the automatic driving information obtaining unit 11, whereas the processing circuit 60 functioning as the processor 61 can implement the functions of the display controller 12 by reading and executing the program stored in the memory 62.

As described above, the processing circuit 60 can implement each of the functions above using hardware, software, or a combination of these.

Figure 8:
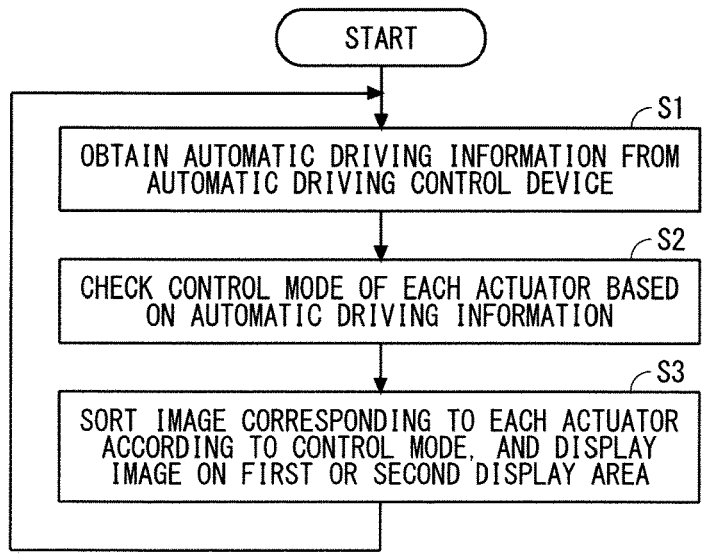
FIG. 8 is a flowchart indicating operations of the vehicle information display control device according to the present invention.

Next, operations of the vehicle information display control device 10 according to Embodiment 1 will be described by giving specific display examples of the automatic driving information. FIG. 8 is a flowchart indicating the operations of the vehicle information display control device 10.

Upon start of the vehicle information display control device 10, the automatic driving information obtaining unit 11 obtains, from the automatic driving control device 33, the automatic driving information including information on a control mode (the manual control mode or the automatic control mode) of each of the actuators (Step S1). The display controller 12 checks the control mode of each of the actuators based on the automatic driving information obtained by the automatic driving information obtaining unit 11 (Step S2). The display controller 12 sorts an image corresponding to each of the actuators according to a control mode of the actuator, and displays the image on the first display area 21 or the second display area 22 of the display 20 (Step S3). The vehicle information display control device 10 repeats this series of operations.

In Step S3, the display controller 12 displays, among images corresponding to the constituent elements of the actuator 50 (the steering 51, the accelerator 52, the brake 53 and the shifter 54), an image corresponding to the actuator in the manual control mode on the first display area 21 and an image corresponding to the actuator in the automatic control mode on the second display area 22.

Figure 9:
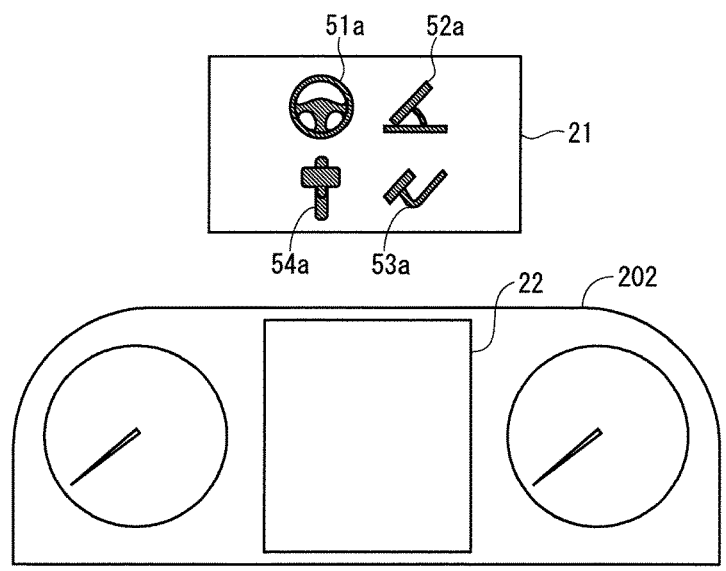
FIG. 9 illustrates a display example of automatic driving information.
Figure 10:
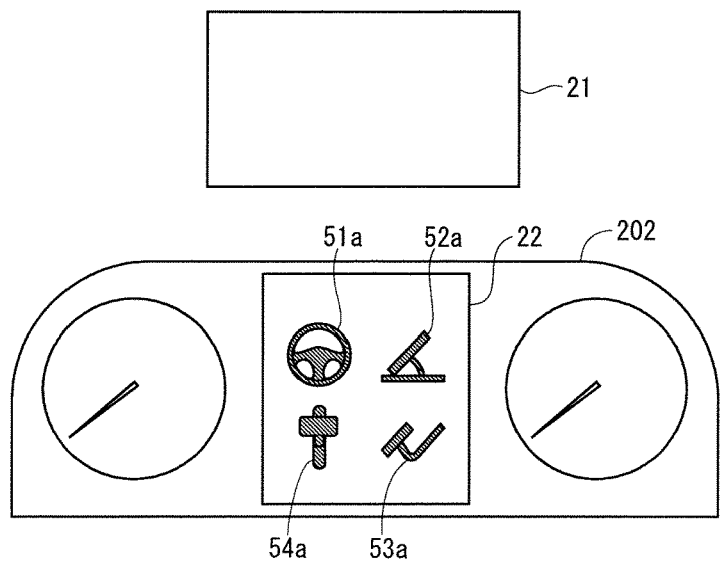
FIG. 10 illustrates a display example of the automatic driving information.

For example, when all of the steering 51, the accelerator 52, the brake 53, and the shifter 54 are in the manual control mode, the display controller 12 displays a steering image 51a corresponding to the steering 51, an accelerator image 52a corresponding to the accelerator 52, a brake image 53a corresponding to the brake 53, and a shifter image 54a corresponding to the shifter 54 on the first display area 21 as illustrated in FIG. 9. Conversely, when all of the steering 51, the accelerator 52, the brake 53, and the shifter 54 are in the automatic control mode, the display controller 12 displays the steering image 51a, the accelerator image 52a, the brake image 53a, and the shifter image 54a on the second display area 22 as illustrated in FIG. 10. Thus, the steering image 51a, the accelerator image 52a, the brake image 53a, and the shifter image 54a move between the first display area 21 and the second display area 22 according to change in the control mode of each of the actuators.

Figure 11:
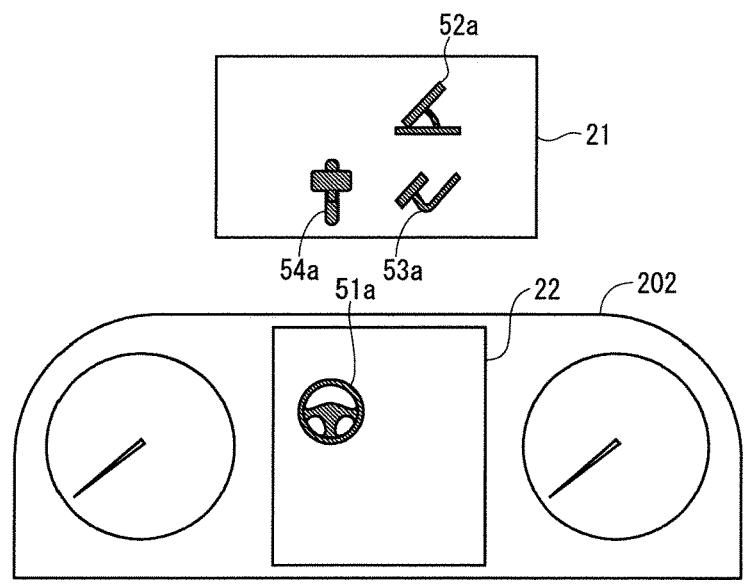
FIG. 11 illustrates a display example of the automatic driving information.

When there is a mix of the actuators in the manual control mode and the actuators in the automatic control mode, the display controller 12 displays an image corresponding to each of the actuators in the manual control mode on the first display area 21, and an image corresponding to each of the actuators in the automatic control mode on the second display area 22. For example, when only the steering 51 is in the automatic control mode and the accelerator 52, the brake 53, and the shifter 54 are in the manual control mode, the display controller 12 displays the accelerator image 52a, the brake image 53a, and the shifter image 54a on the first display area 21 and the steering image 51a on the second display area 22 as illustrated in FIG. 11.

Since the driving assistance system according to Embodiment 1 sorts the images corresponding to the actuators (the steering image 51a, the accelerator image 52a, the brake image 53a, and the shifter image 54a) according to the control mode of the actuators and displays the images on the first display area 21 or the second display area 22 of the display 20, the driver can easily understand the control mode of each of them actuators from the display position.

Figure 12:
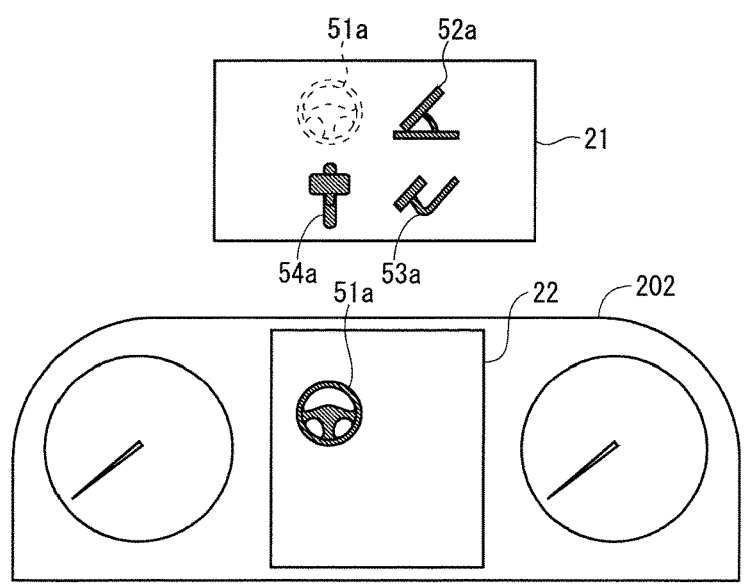
FIG. 12 illustrates a display example of the automatic driving information.
Figures 13A, 13B, 13C, 13D:
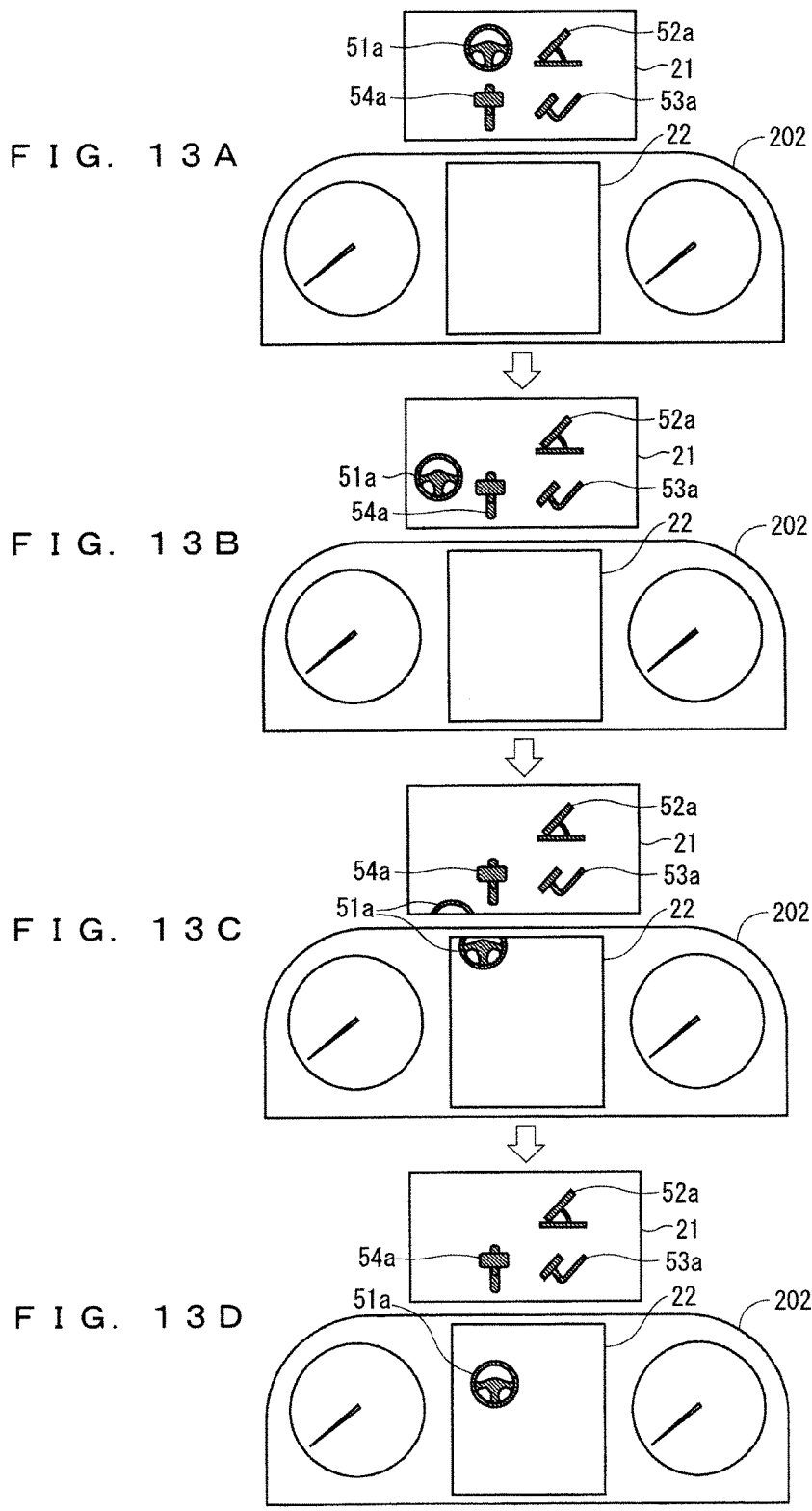
FIGS. 13A to 13D illustrate an example display change in the automatic driving information.

The image corresponding to the actuator in the automatic control mode may remain in the first display area 21 in an unobtrusive display mode without being completely deleted from the first display area 21 (for example, the image may be displayed by a broken line, colored in gray, or reduced in luminance). FIG. 12 illustrates an example where the image corresponding to the actuator in the automatic control mode (here, the steering image 51a) is displayed on the second display area 22 and also remains in the first display area 21 in an unobtrusive display mode (here, displayed by the broken line).

Here, the automatic control mode may have two types, one not allowing any intervention with a manual operation and the other switching to the manual control mode upon a manual operation. The automatic control mode may be distinguished between the two types. For example, when the steering 51 is in the automatic control mode of not allowing any intervention with a manual operation, the steering image 51a may be deleted from the first display area 21 and displayed on the second display area 22 as illustrated in FIG. 11. When the steering 51 is in the automatic control mode of switching to the manual control mode upon a manual operation, the steering image 51a may be displayed on the second display area 22 while remaining in the first display area 21 in the unobtrusive display mode as illustrated in FIG. 12.

When the steering image 51a, the accelerator image 52a, the brake image 53a, and the shifter image 54a move between the first display area 21 and the second display area 22, the images may have animation effects. For example, FIGS. 13A to 13D illustrate an example display change where the steering image 51a displayed on the first display area 21 moves downward, disappears from the first display area 21, and then appears from an upper portion of the second display area 22 when the steering 51 is switched from the manual control mode to the automatic control mode.

When the HUD that displays an image on the first display area 21 can change a virtual image distance (an apparent distance from the driver to the image displayed by the HUD), the image may have an animation effect with depth. This animation effect may be produced by changing the virtual image distance of the steering image 51a uninterruptedly or stepwise. For example, FIGS. 14A to 14C illustrate an example display change where the steering image 51a displayed on the first display area 21 moves closer to the driver and disappears from the first display area 21 when the steering 51 is switched from the manual control mode to the automatic control mode.

In the DESCRIPTION, the movement of the image with depth as illustrated in FIGS. 14A to 14C are represented by a graph indicating change in the virtual image distance with respect to the time as illustrated in FIG. 15 (here, the virtual image distance of the image on the first display area 21 is assumed to be 50 m). Although FIGS. 14A to 14C and 15 illustrate the example where the steering image 51a on the first display area 21 disappears after moving closer to the driver, it may disappear after moving away from the driver as illustrated in FIG. 16.

Although Embodiment 1 describes the example of the HUD implementing the first display area 21 on which the image corresponding to the actuator in the manual control mode is displayed and the LCD implementing the second display area 22 on which the image corresponding to the actuator in the automatic control mode is displayed, these may be the other way around. In other words, a system may be configured by the LCD implementing the first display area 21 and the HUD implementing the second display area 22.

[Embodiment 2]

Embodiment 2 will describe an example where the HUD implements both the first display area 21 and the second display area 22 of the display 20. The HUD functioning as the display 20 can simultaneously display a plurality of images with different virtual image distances according to Embodiment 2.

When a virtual image position is represented by three-dimensional polar coordinates as previously illustrated in FIG. 5, a surface with an equal virtual image distance (ri) form a spherical surface. However, when the virtual image direction is restricted within a certain area (ahead of a vehicle) as the HUD for vehicle, the surface with the equal virtual image distance may approximate to a plane. In reality, many HUDs are optically designed to make each display surface of a virtual image a plane. In the following description, the surface with the equal virtual image distance will be treated as a plane as illustrated in FIG. 19 (in FIG. 17, the y axis is defined as a traveling direction of a vehicle, and the plane where y=ri is defined as a display surface with the virtual image distance ri).

As illustrated in FIG. 18, for example, when the HUD displays a first image 100a with a virtual image distance of 25 m, a second image 100b with a virtual image distance of 50 m, and a third image 100c with a virtual image distance of 75 m, the driver views the first image 100a, the second image 100b, and the third image 100c as if they were 25 m ahead, 50 m ahead, and 75 m ahead, respectively.

As illustrated in FIG. 19, the first display area 21 on which images with a virtual image distance of 50 m are to be displayed, and the second display area 22 on which images with a virtual image distance of 20 m are to be displayed are defined on the windshield 201 according to Embodiment 2. In other words, the first display area 21 is a virtual screen 50 m ahead of the driver, and the second display area 22 is a virtual screen 20 m ahead of the driver. The first display area 21 and the second display area 22 may overlap one another when viewed from the driver.

Figure 20:
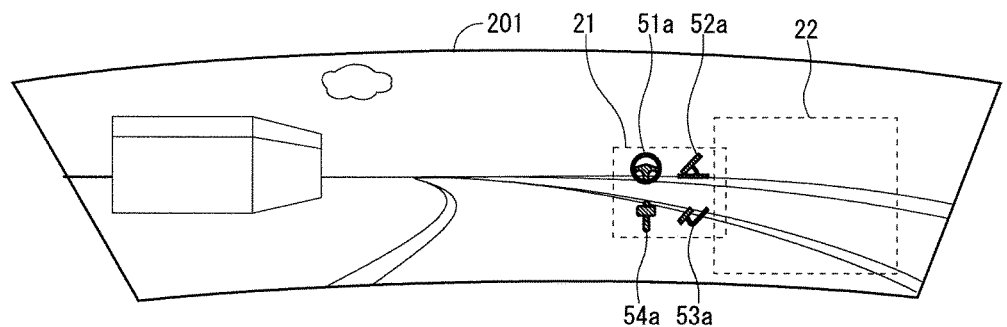
FIG. 20 illustrates a display example of the automatic driving information.
Figure 21:
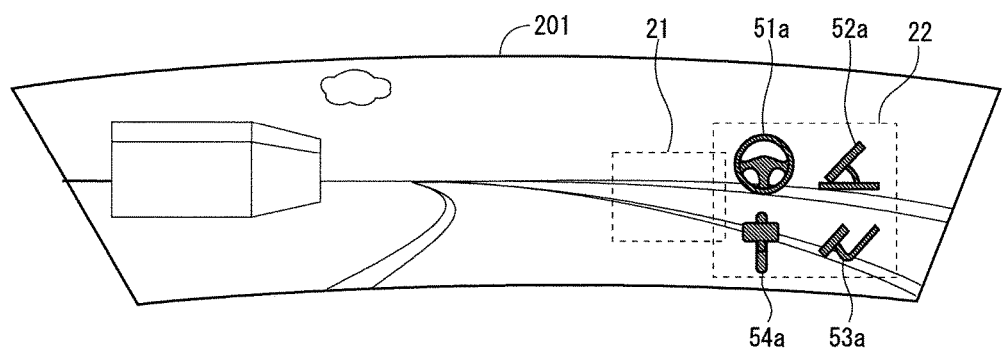
FIG. 21 illustrates a display example of the automatic driving information.

The operations of the vehicle information display control device 10 are basically the same as those according to Embodiment 1 (FIG. 8). For example, when all of the steering 51, the accelerator 52, the brake 53, and the shifter 54 are in the manual control mode, the display controller 12 displays the steering image 51a, the accelerator image 52a, the brake image 53a, and the shifter image 54a on the first display area 21 as illustrated in FIG. 20 (the virtual image distance of each of the images displayed on the first display area 21 is 50 m). Conversely, when all of the steering 51, the accelerator 52, the brake 53, and the shifter 54 are in the automatic control mode, the display controller 12 displays the steering image 51a, the accelerator image 52a, the brake image 53a, and the shifter image 54a on the second display area 22 as illustrated in FIG. 21 (the virtual image distance of each of the images displayed on the second display area 22 is 20 m).

Figure 22:
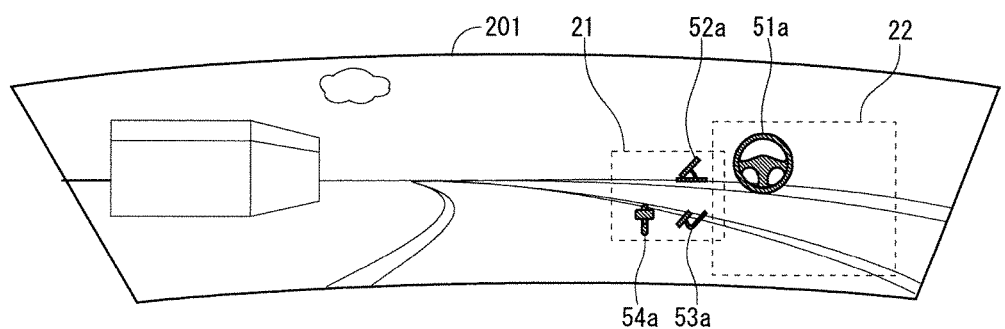
FIG. 22 illustrates a display example of the automatic driving information.
Figure 23A:
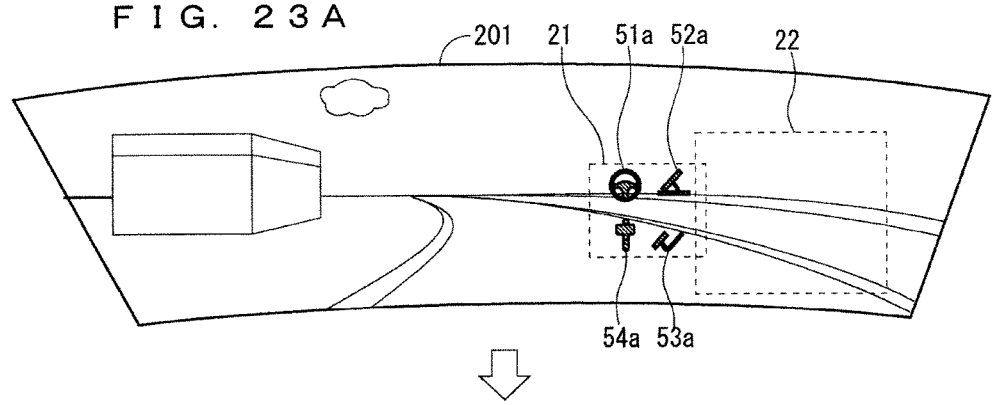
FIGS. 23A to 23C illustrate an example display change in the automatic driving information.
Figure 23B:
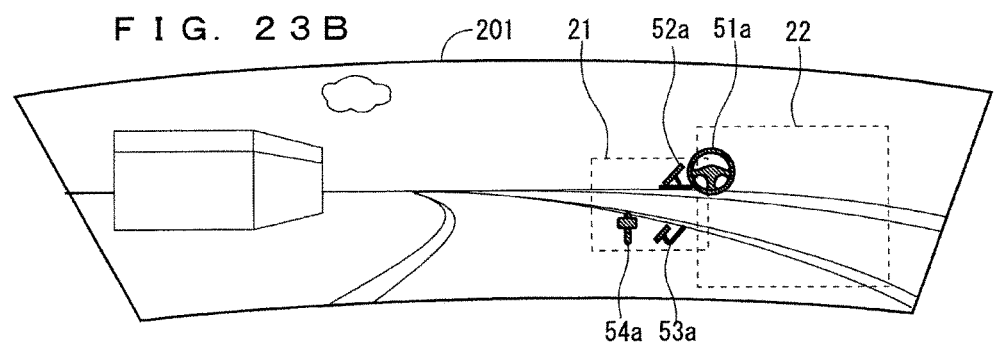
Figure 23C:
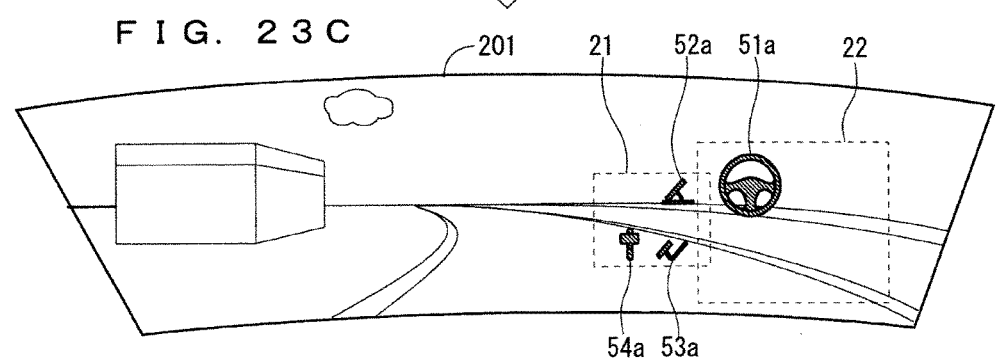
Figure 24:
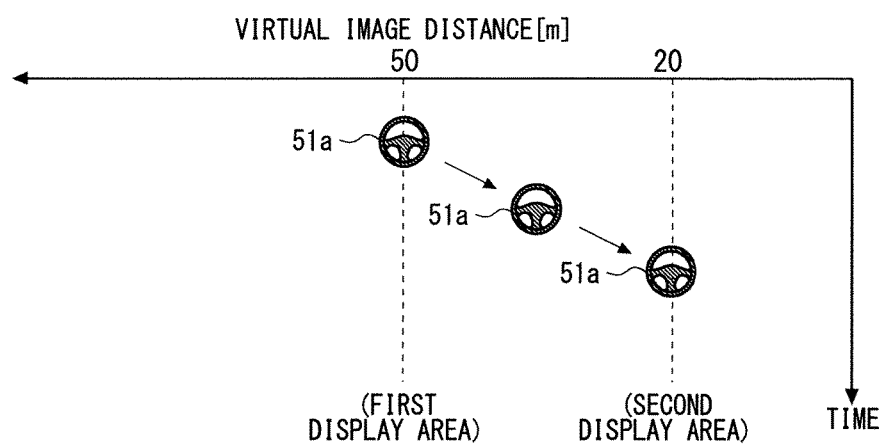
FIG. 24 illustrates an example display change in the automatic driving information.

When there is a mix of the actuators in the manual control mode and the actuators in the automatic control mode, the display controller 12 displays an image corresponding to each of the actuators in the manual control mode on the first display area 21, and an image corresponding to each of the actuators in the automatic control mode on the second display area 22. For example, when only the steering 51 is in the automatic control mode and the accelerator 52, the brake 53, and the shifter 54 are in the manual control mode, the display controller 12 displays the accelerator image 52a, the brake image 53a, and the shifter image 54a on the first display area 21 and the steering image 51a on the second display area 22 as illustrated in FIG. 22.

Since the vehicle information display control device 10 according to Embodiment 2 sorts images corresponding to the actuators (the steering image 51a, the accelerator image 52a, the brake image 53a, and the shifter image 54a) according to the control mode of the actuators and displays each of the images on one of the first display area 21 and the second display area 22 with different apparent distances, the driver can easily understand the control mode of each of the actuators from the display position.

Figure 25:
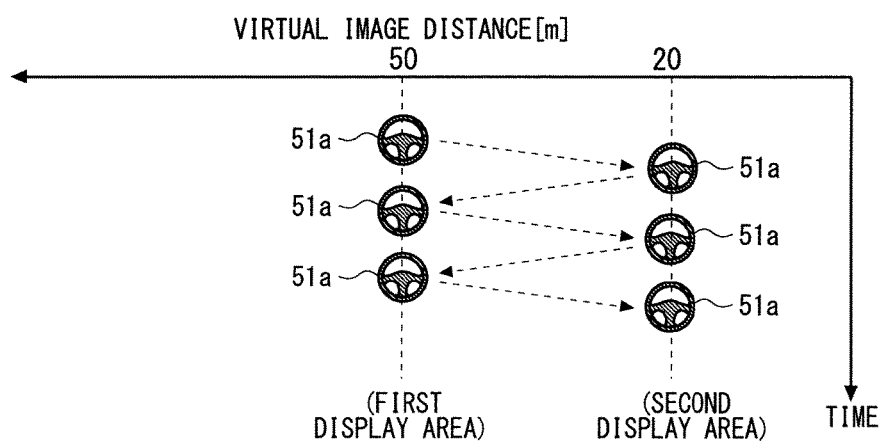
FIG. 25 illustrates an example display change in the automatic driving information.

When the steering image 51a, the accelerator image 52a, the brake image 53a, and the shifter image 54a move between the first display area 21 and the second display area 22, the images may have animation effects. For example, FIGS. 23A to 23C and 24 illustrate an example display change where the steering image 51a displayed on the first display area 21 moves closer to the driver and stops on the second display area 22 upon switching of the steering 51 from the manual control mode to the automatic control mode. This animation effect is produced by changing the virtual image distance of the steering image 51a from 50 m to 20 m uninterruptedly or stepwise. Likewise, FIG. 25 illustrates an example display change where the steering image 51a displayed on the first display area 21 alternately appears between the first display area 21 and the second display area 22 several times and finally stops on the second display area 22.

Although the apparent distances of the first display area 21 and the second display area 22 from the driver are 50 m and 20 m, respectively, in Embodiment 2, these distances are not limited to such. The second display area 22 may be disposed farther from the first display area 21.

In the examples of FIGS. 20 to 22, a solid angle of each of the images displayed on the first display area 21 and the second display area 22 when viewed from the driver (equivalent to the size of the image when viewed from the driver) is inversely proportional to the square of a distance between the images in perspective. This indicates that the image on the first display area 21 appearing far (the image corresponding to the actuator in the manual control mode) looks much smaller than the image on the second display area 22 appearing close (the image corresponding to the actuator in the automatic control mode). However, the relationship in solid angle between the image on the first display area 21 and the image on the second display area 22 need not accurately follow the perspective. Even when the apparent distance between the images is close, change in the solid angle may be gradual. For example, a solid angle of each of the images on the first display area 21 and the second display area 22 may be determined according to a conversion equation using a distance between the images as a variable so that the solid angle of the image on the second display area 22 is twice the solid angle of the image on the first display area 21 when viewed from the driver. In reverse perspective, the solid angle of the image on the second display area 22 appearing close may be smaller than or equal to the solid angle of the image on the first display area 21 appearing far. Here, the image on the first display area 21 can be prevented from becoming unobtrusive more than necessary, compared to the image on the second display area 22.

[Embodiment 3]

Embodiment 3 will describe a specific example of interworking between the vehicle information display control device 10 and the automatic driving system 30. Although the example in the driving assistance system according to Embodiment 2 will be described, Embodiment 3 is applicable to the system according to Embodiment 1.

Figure 26:
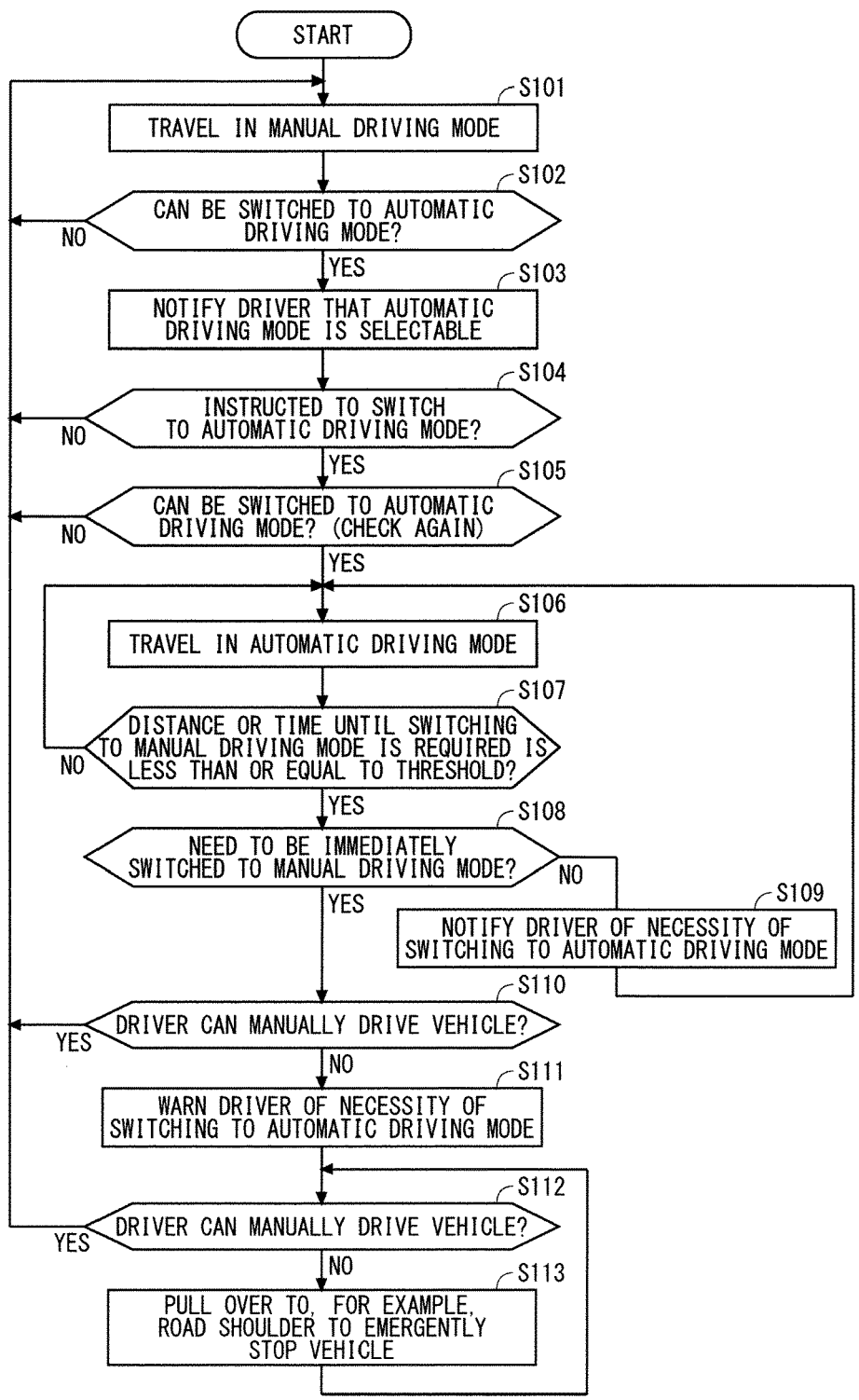
FIG. 26 is a flowchart indicating operations of an automatic driving system according to Embodiment 3.

FIG. 26 is a flowchart indicating operations of the automatic driving system 30. The flows in FIG. 26 indicate an example of the operations of the automatic driving system 30, and do not limit the application of the present invention. For the sake of simplicity, the operation modes of the subject vehicle defined in the automatic driving system 30 are assumed to be only two types: the manual driving mode in which all the elements of the actuator 50 operate in the manual control mode and the automatic driving mode in which all the elements of the actuator 50 operate in the automatic control mode.

The automatic driving information obtained by the automatic driving information obtaining unit 11 from the automatic driving control device 33 includes, besides the information indicating that each of the actuators of the subject vehicle is in the manual control mode or the automatic control mode, information indicating that the actuators in the manual control mode can be switched to the automatic control mode, information on a distance or a time until the actuators in the automatic control mode need to be switched to the manual control mode, and information on a distance or a time until the actuators in the manual control mode can be switched to the automatic control mode.

Figure 27:
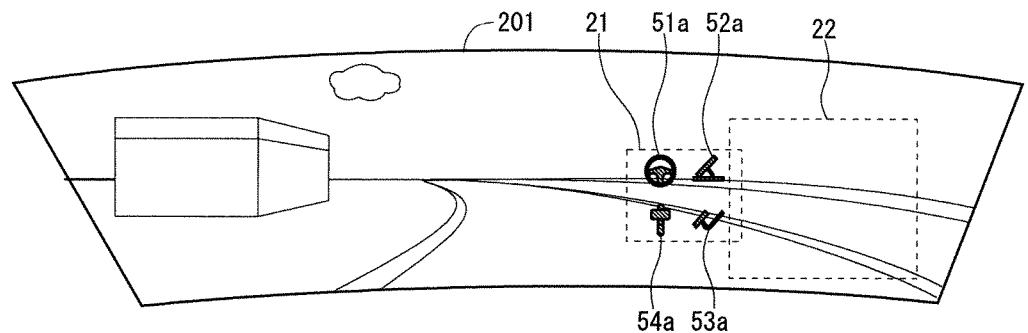
FIG. 27 illustrates a display example of the automatic driving information.

Immediately after the automatic driving system 30 is started, the automatic driving control device 33 sets the subject vehicle to the manual driving mode (Step S101). Since the actuator 50 is in the manual control mode, the display controller 12 of the vehicle information display control device 10 displays the steering image 51a, the accelerator image 52a, the brake image 53a, and the shifter image 54a on the first display area 21 as illustrated in FIG. 27.

While the subject vehicle is traveling in the manual driving mode, the automatic driving control device 33 checks whether the subject vehicle can be switched to the automatic driving mode, based on the driving-related information obtained by the driving-related information obtaining device 31 (Step S102). For example, when the automatic driving mode is permitted on a motorway such as a highway, the automatic driving control device 33 checks a road on which the subject vehicle is traveling, using the map information and the information on the current position of the subject vehicle, and determines that the subject vehicle can be switched to the automatic driving mode when the subject vehicle is traveling the motorway.

Figure 28:
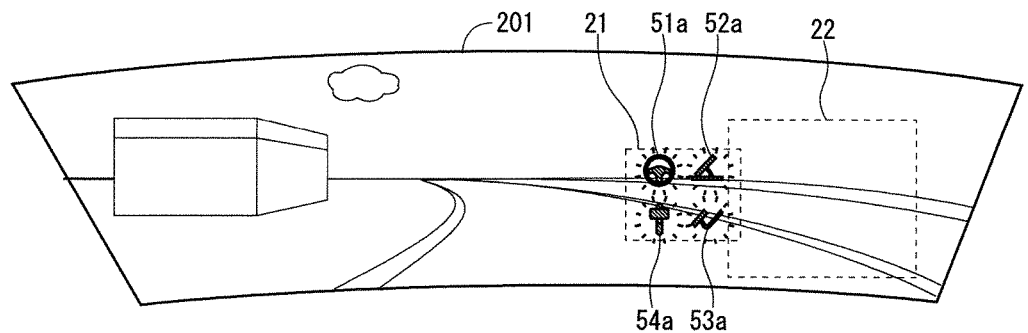
FIG. 28 illustrates a display example of the automatic driving information.

When the subject vehicle can be switched to the automatic driving mode (YES in Step S102), the automatic driving control device 33 notifies the driver of it using the HMI device 32 (Step S103). Here, the display controller 12 detects the notification by the automatic driving system 30 in Step S103 based on the automatic driving information, and performs the notification using the display 20. Examples of the conceivable notification method include blinking the steering image 51a, the accelerator image 52a, the brake image 53a, and the shifter image 54a on the first display area 21 as illustrated in FIG. 28. After the notification, the driver can instruct the automatic driving control device 33 to switch to the automatic driving mode by operating the HMI device 32.

Upon receipt of the instruction for switching to the automatic driving mode (YES in Step S104), the automatic driving control device 33 checks again that the subject vehicle can be switched to the automatic driving mode (Step S105), and switches the subject vehicle to the automatic driving mode (Step S106). Without any instruction for switching to the automatic driving mode (NO in Step S104) or when the subject vehicle cannot be switched to the automatic driving mode even with the instruction (NO in Step S105), the processes are returned to Step S101, and the manual driving mode is continued.

Figure 29:
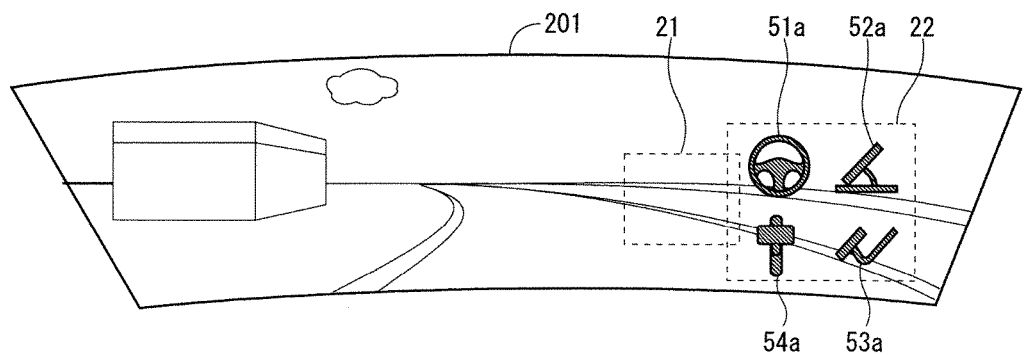
FIG. 29 illustrates a display example of the automatic driving information.

Since the actuator 50 is in the automatic control mode with the subject vehicle set to the automatic driving mode, the display controller 12 of the vehicle information display control device 10 deletes the steering image 51a, the accelerator image 52a, the brake image 53a, and the shifter image 54a from the first display area 21 and displays these images on the second display area 22 as illustrated in FIG. 29. In other words, the display controller 12 moves the steering image 51a, the accelerator image 52a, the brake image 53a, and the shifter image 54a from the first display area 21 to the second display area 22.

While the subject vehicle is traveling in the automatic driving mode, the automatic driving control device 33 checks whether a distance or a time until switching to the manual driving mode is required is less than or equal to a predetermined threshold, based on the driving-related information obtained by the driving-related information obtaining device 31 (Step S107). For example, when the automatic driving mode is not permitted except on a motorway, the automatic driving control device 33 calculates a distance or a time until the subject vehicle gets off the motorway, using the map information, the information on the current position of the subject vehicle, and the information on the planned travel route of the subject vehicle, and compares the value with the threshold. It is preferred that the threshold is, for example, 5 km in distance or approximately 5 minutes in time. When the distance or the time until switching to the manual driving mode is required is more than the threshold (NO in Step S107), the processes are returned to Step S106, and the automatic driving mode is continued.

When the distance or the time until switching to the manual driving mode is required is less than or equal to the threshold (YES in Step S107), the automatic driving control device 33 further checks whether the subject vehicle needs to be immediately switched to the manual driving mode (Step S108). The automatic driving control device 33 checks it by comparing the distance or the time until switching to the manual driving mode is required with a second threshold smaller than the threshold in Step S107. Although the second threshold may be 0, it may be 1 km in distance or 1 minute in time with a margin given.

When the subject vehicle need not be immediately switched to the manual driving mode (NO in Step S108), the automatic driving control device 33 notifies the driver of the necessity of switching to the automatic driving mode through the HMI device 32 (Step S109), and continues the automatic driving mode. Here, the display controller 12 detects the notification by the automatic driving system 30 in Step S109 based on the automatic driving information, and performs the notification using the display 20. Examples of the conceivable notification method include blinking the steering image 51a, the accelerator image 52a, the brake image 53a, and the shifter image 54a on the second display area 22 as illustrated in FIG. 30.

The driver can return the subject vehicle to the manual driving mode (Step S101) by operating the HMI device 32 with any timing when the subject vehicle is in the automatic driving mode, although its illustration is omitted in FIG. 26. Normally, the driver will voluntarily switch the subject vehicle to the manual driving mode upon receipt of the notification in Step S109.

However, if the subject vehicle still continues to travel in the automatic driving mode, the subject vehicle needs to be immediately switched to the manual driving mode (YES in Step S108). Here, the automatic driving control device 33 determines whether the driver can manually drive the subject vehicle (Step S110). The automatic driving control device 33 makes this determination based on, for example, the line of sight, the arousal level, and the limb position of the driver (whether the manual driving device 40 is being operated). When the driver can manually drive the subject vehicle (YES in Step S110), the processes are returned to Step S101, and the automatic driving control device 33 switches the subject vehicle to the manual driving mode.

However, when the driver cannot manually drive the subject vehicle (NO in Step S110), the automatic driving control device 33 warns the driver of the necessity of switching to the automatic driving mode (Step S111). Here, the display controller 12 detects the warning by the automatic driving system 30 in Step S111 based on the automatic driving information, and performs the warning using the display 20. Examples of the conceivable warning method include changing the colors of the steering image 51a, the accelerator image 52a, the brake image 53a, and the shifter image 54a on the second display area 22 from the state illustrated in FIG. 30 into more prominent colors as illustrated in FIG. 31.

After the warning in Step S111, the automatic driving control device 33 checks again whether the driver can manually drive the subject vehicle using the manual driving device 40 (Step S112). When the driver can manually drive the subject vehicle (YES in Step S112), the processes are returned to Step S101, and the automatic driving control device 33 switches the subject vehicle to the manual driving mode.

However, when the driver cannot manually drive the subject vehicle (NO in Step S112), the automatic driving control device 33 pulls over to, for example, a road shoulder to emergently stop the subject vehicle (Step S113), returns to Step S112, and waits until the driver can manually drive the subject vehicle.

Since the driving assistance system according to Embodiment 3 sorts images corresponding to the actuators (the steering image 51a, the accelerator image 52a, the brake image 53a, and the shifter image 54a) according to the control mode of the actuators and displays the images on the first display area 21 or the second display area 22, the driver can easily understand the control mode of each of the actuators from the display position.

The screens that the display controller 12 causes the display 20 to display upon the notification in Step S103 and Step S109 and the warning in Step S111 are not limited to the examples in FIG. 28, FIG. 30, and FIG. 31, respectively, but may be in any modes. In other words, the display mode of the image corresponding to each of the actuators may be changed from the normal condition. The conceivable methods of changing the image include changing the size, the shape, the movement, and the display position of the image other than the blinking and changing the color. The types of the notification and the warning are not limited to the above three. For example, when the automatic driving mode is used on an ordinary road and a pedestrian or another vehicle is detected around the subject vehicle, the notification may alert the driver to the detected existence and encourage the driver to switch to the manual driving mode.

[Embodiment 4]

Embodiment 4 will propose a method for notifying a distance or a time until the actuator can be switched to the automatic control mode and a method for notifying a distance or a time until switching the actuator to the manual control mode is required in Embodiment 2.

First, an example method for notifying a distance or a time up to a section at which the actuator can be switched to the automatic control mode will be described. FIGS. 32A to 32C and 33 illustrate an example of notifying a distance or a time up to a section at which the subject vehicle can switch the steering 51 to the automatic control mode (an automatic steerable section).

Figure 32A:
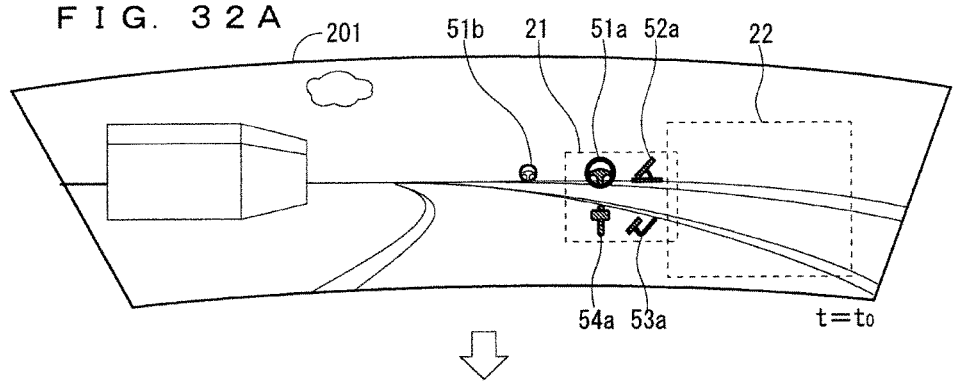
FIGS. 32A to 32C illustrate a method for notifying a distance or a time up to an automatic steerable section according to Embodiment 4.

For example, when a distance from the subject vehicle to the automatic steerable section at a time t0 is 5 km, the display controller 12 controls the display 20 so that a notification image 51b imitating the steering image 51a is displayed with the virtual image distance of 100 m as illustrated in FIG. 32A. Preferably, the notification image 51b is distinguished from the steering image 51a, and has a color (for example, gray) or lightness that is less prominent than that of the steering image 51a.

Figure 32B:
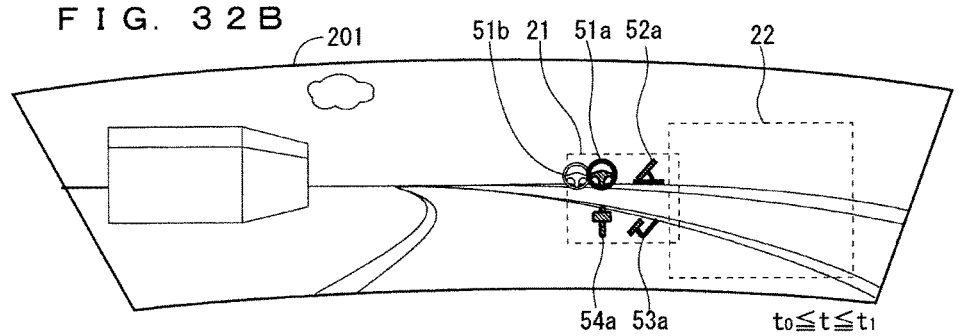
Figure 32C:
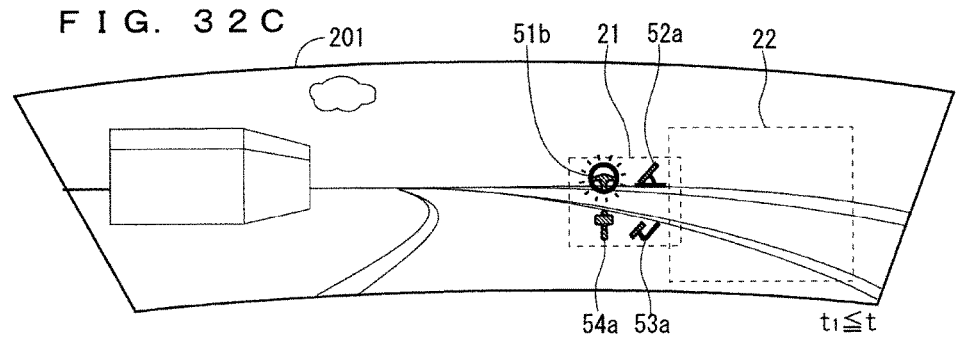
Figure 33:
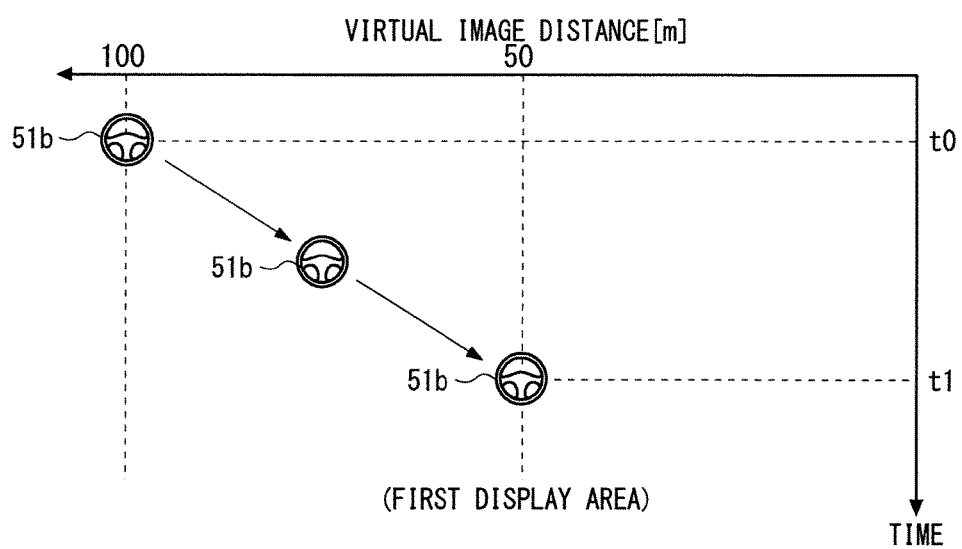
FIG. 33 illustrates an example change in the virtual image distance of a notification image.

Then, as the subject vehicle approaches the automatic steerable section, the display controller 12 shortens the virtual image distance of the notification image 51b to bring the notification image 51b closer to the steering image 51a on the first display area 21 as illustrated in FIG. 32B. At a time t1 when the subject vehicle reaches the automatic steerable section, the notification image 51b is at the same position as that of the steering image 51a, and completely overlaps the steering image 51a. Here, the notification in Step S103 in the flows of FIG. 26 may be performed by, for example, blinking the steering image 51a as illustrated in FIG. 32C.

In the example of FIGS. 32A to 32C and 33, a difference in distance between the notification image 51b and the steering image 51a on the first display area 21 represents the distance or the time from the subject vehicle to the automatic steerable section. Thus, the driver can intuitively understand, from the display, the distance or the time from the subject vehicle to the automatic steerable section.

FIGS. 34A to 34C and 35 illustrate another example of notifying the distance or the time from the subject vehicle to the automatic steerable section.

Figure 34A:
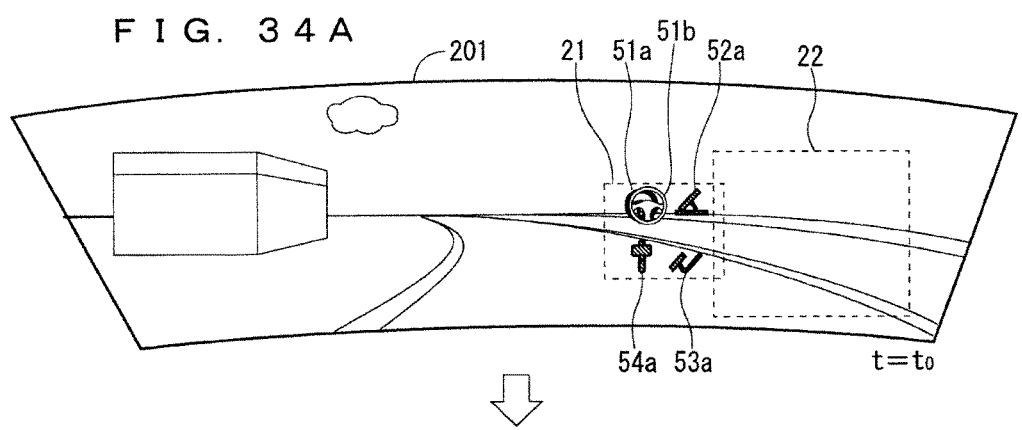
FIGS. 34A to 34C illustrate a method for notifying the distance or the time up to the automatic steerable section according to Embodiment 4.

For example, when a distance from the subject vehicle to the automatic steerable section at the time t0 is 5 km, the display controller 12 controls the display 20 so that the notification image 51b imitating the steering image 51a is displayed at the position of the steering image 51a on the first display area 21 as illustrated in FIG. 34A.

Figure 34B:
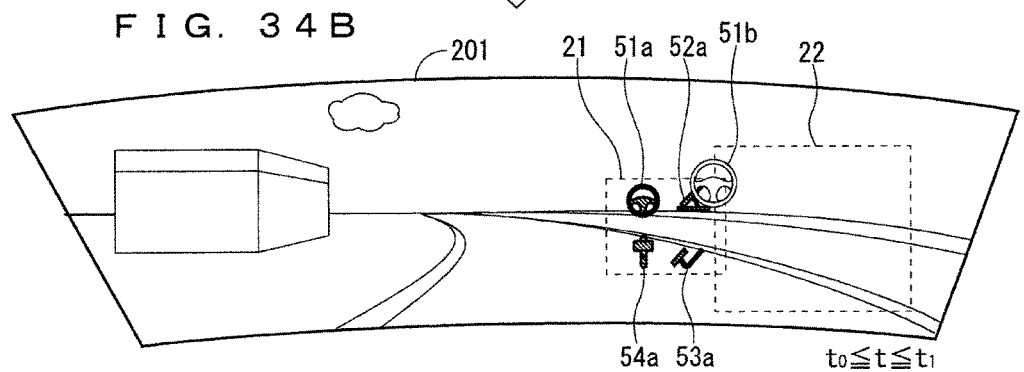
Figure 34C:
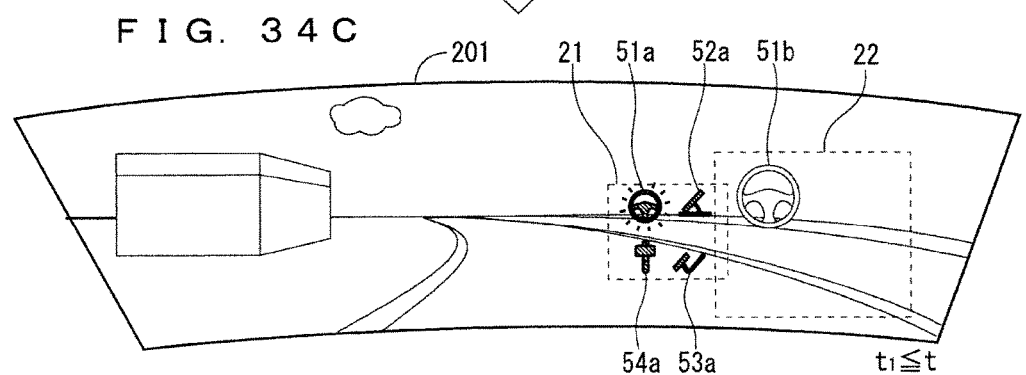
Figure 35:
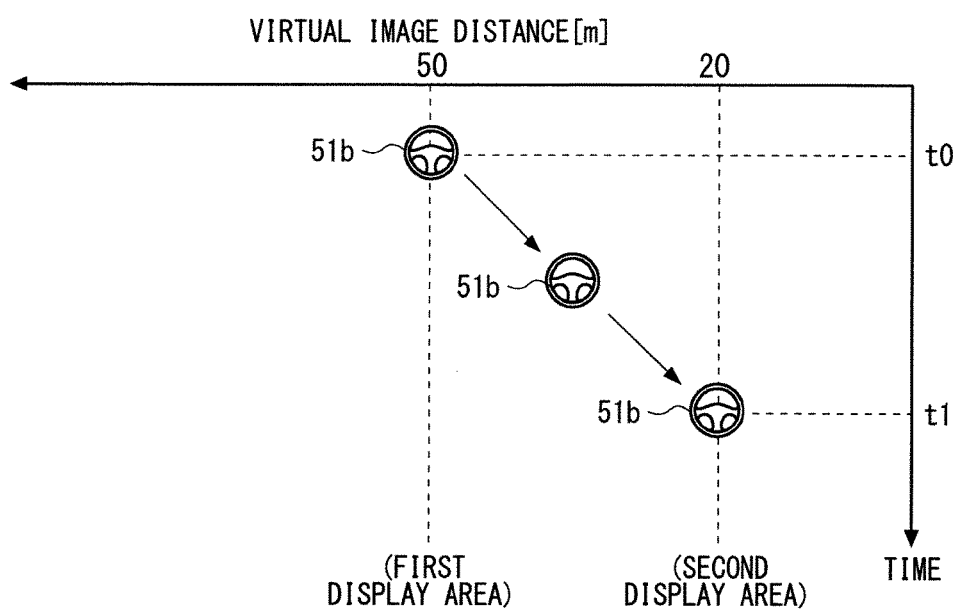
FIG. 35 illustrates an example change in the virtual image distance of the notification image.

Then, as the subject vehicle approaches the automatic steerable section, the display controller 12 shortens the virtual image distance of the notification image 51b to bring the notification image 51b closer to a display position of the steering image 51a on the second display area 22 (a position at which the steering image 51a is to be displayed when the steering 51 is in the automatic control mode) as illustrated in FIG. 34B. At the time t1 when the subject vehicle reaches the automatic steerable section, the notification image 51b is at the same display position as that of the steering image 51a on the second display area 22. Here, the notification in Step S103 in the flows of FIG. 26 may be started by, for example, blinking the steering image 51a as illustrated in FIG. 34C.

In the example of FIGS. 34A to 34C and 35, a difference in distance between the notification image 51b and the display position of the steering image 51a on the second display area 22 represents the distance or the time from the subject vehicle to the automatic steerable section.

Next, an example of the method for notifying a distance or a time up to a section at which an actuator needs to switch to the manual control mode will be described. FIGS. 36A to 36C and 37 illustrate an example of notifying a distance or a time up to a section at which the subject vehicle needs to switch the steering 51 to the manual control mode (a manual steering required section).

Figure 36A:
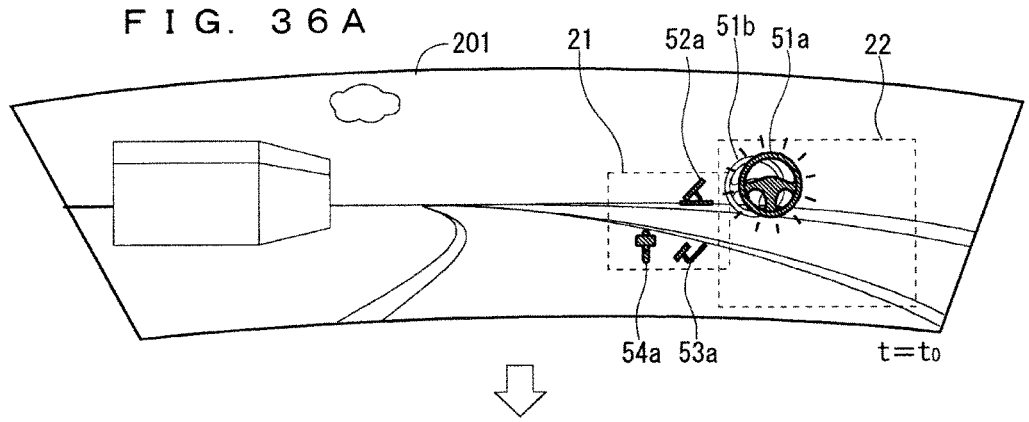
FIGS. 36A to 36C illustrate a display example of a distance or a time up to a manual steering required section according to Embodiment 4.

For example, when a distance from the subject vehicle to the manual steering required section at the time t0 is 5 km, the display controller 12 controls the display 20 so that the notification image 51b imitating the steering image 51a is displayed at the position of the steering image 51a on the second display area 22 as illustrated in FIG. 36A. Here, the notification in Step S109 in the flows of FIG. 26 may be started by, for example, blinking the steering image 51a.

Figure 36B:
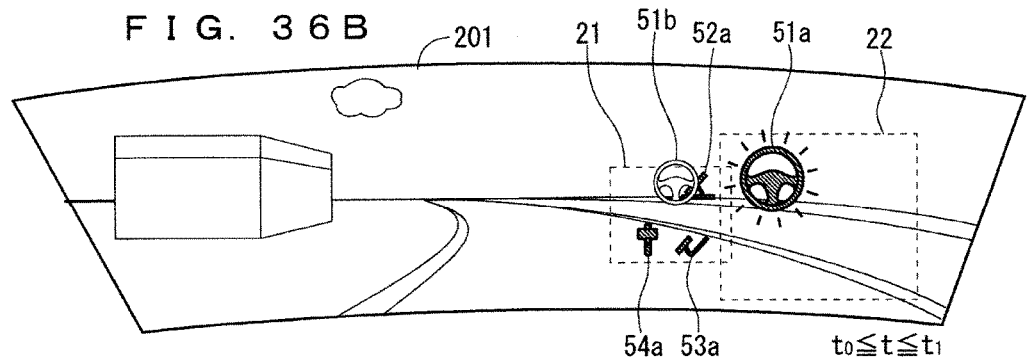
Figure 36C:
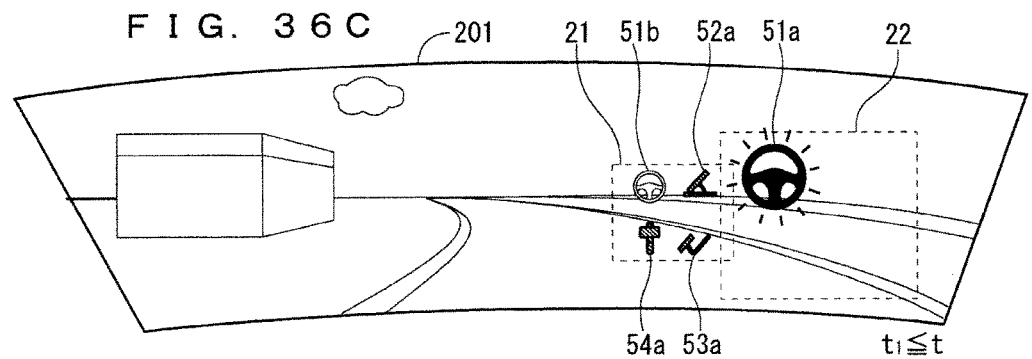
Figure 37:
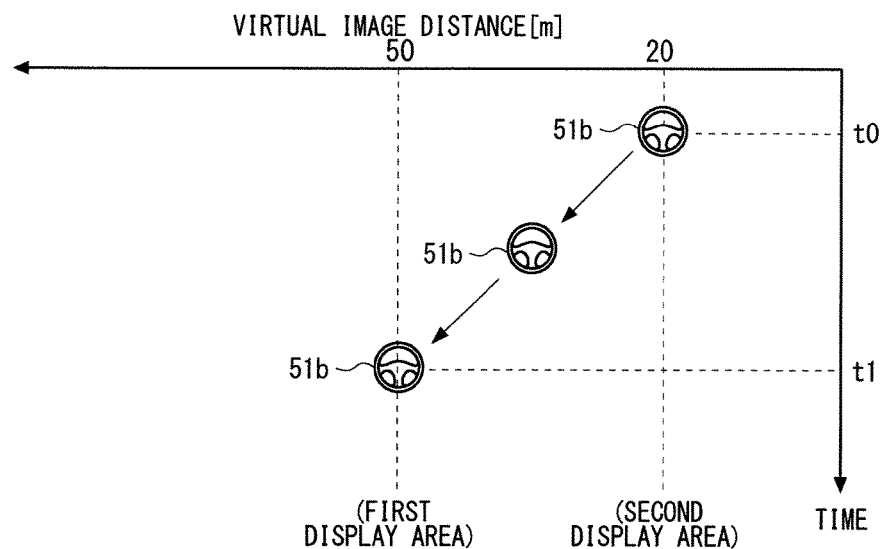
FIG. 37 illustrates an example change in the virtual image distance of the notification image.

Then, as the subject vehicle approaches the manual steering required section, the display controller 12 shortens the virtual image distance of the notification image 51b to bring the notification image 51b closer to a display position of the steering image 51a on the first display area 21 (a position at which the steering image 51a is to be displayed when the steering 51 is in the manual control mode) as illustrated in FIG. 36B. At the time t1 when the subject vehicle reaches the manual steering required section (or a time when the distance or the time up to the manual steering required section is less than or equal to the second threshold), the notification image 51b is at the same display position as that of the steering image 51a on the first display area 21. Here, the warning in Step S111 in the flows of FIG. 26 may be performed by, for example, changing the color of the steering image 51a as illustrated in FIG. 36C.

Although Embodiment 2 describes the example of controlling the virtual image distance and implementing two virtual display areas in the HUD, for example, a three-dimensional autostereoscopic display may render two planes with different apparent distances (corresponding to the first display area 21 and the second display area 22) and display an image corresponding to the actuator in the manual control mode and an image corresponding to the actuator in the automatic control mode on the different planes. Moreover, a landscape image obtained by capturing an image ahead of the subject vehicle using a camera may be displayed as the background image. Here, the screen of the display will produce a visual effect similarly as that produced by the HUD.

A liquid crystal display including two overlaid display surfaces (at least the closer display surface is transparent) may realize the first display area 21 and the second display area 22. For example, the image corresponding to the actuator in the manual control mode may be displayed on the deeper display surface (one far from the driver) as the first display area 21, whereas the image corresponding to the actuator in the automatic control mode may be displayed on the closer display surface (one closer to the driver) as the second display area 22. In a configuration enabling the display controller 12 to control the position of at least one of the display surfaces, physically moving the first display area 21 or the second display area 22 back and forth may produce the animation effect in an image corresponding to the actuator in the manual control mode or an image corresponding to the actuator in the automatic control mode.

In the example of FIGS. 36A to 36C and 37, a difference in distance between the notification image 51b and the display position of the steering image 51a on the first display area 21 represents the distance or the time from the subject vehicle to the manual steering required section. Thus, the driver can intuitively understand, from the display, the distance or the time from the subject vehicle to the manual steering required section.

The present invention enables an easy distinction between an image corresponding to the actuator in the manual control mode and an image corresponding to the actuator in the automatic control mode by using different display areas. Further, the images may have different display modes. For example, the image corresponding to the actuator in the manual control mode and the image corresponding to the actuator in the automatic control mode may have different tints such as hue, lightness, and chroma.

For example, the image corresponding to the actuator in the manual control mode and appearing far and the image corresponding to the actuator in the automatic control mode and appearing close according to Embodiment 2 may have different tints in atmospheric perspective.

For example, the image corresponding to the actuator in the manual control mode may be a planar image, whereas the image corresponding to the actuator in the automatic control mode may be a stereoscopic image. The animation effects (for example, the blinking and changing the color) may be applied to only one of the image corresponding to the actuator in the manual control mode and the image corresponding to the actuator in the automatic control mode.

Figure 38:
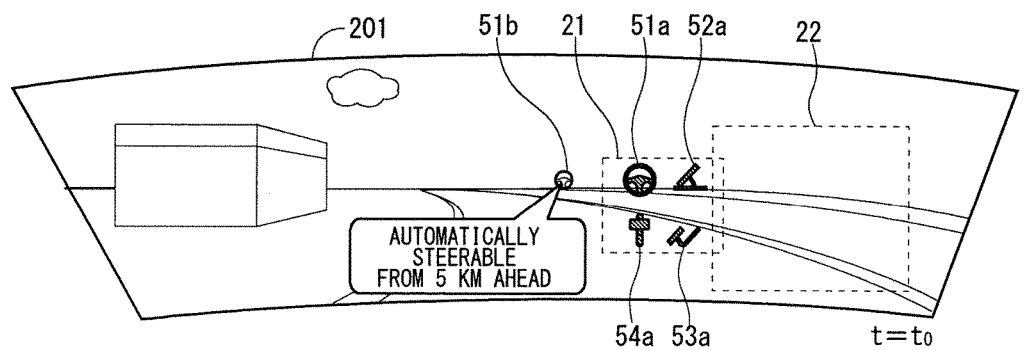
FIG. 38 illustrates a display example of textual information.

When the HUD is used as the display 20, textual information may be added for display to complement information on an image that will appear far. For example, FIG. 38 illustrates an example of displaying, as the textual information, information indicated by the notificationimage 51b in FIG. 32A (a distance up to the automatic steerable section).

Obviously, the automatic driving to which the present invention is applicable includes automatic parking. The automatic driving also includes semi-automatic parking in which a steering wheel operation (steering control) is performed automatically but an accelerator operation needs to be performed manually, and quasi-automatic parking in which all of the steering, the accelerator, and the other actuators are controlled automatically.

Embodiments according to the present invention can be freely combined or appropriately modified and omitted within the scope of the invention.

Although this invention has been described in detail, the description is in all aspects illustrative and does not restrict the invention. Therefore, numerous modifications that have yet been exemplified will be devised without departing from the scope of this invention.

EXPLANATION OF REFERENCE SIGNS 10 vehicle information display control device, 11 automatic driving information obtaining unit, 12 display controller, 20 display, 21 first display area, 22 second display area, 30 automatic driving system, 31 driving-related information obtaining device, 32 HMI device, 33 automatic driving control device, 40 manual driving device, 41 steering wheel, 42 accelerator pedal, 43 brake pedal, 44 shift lever, 50 actuator, 51 steering, 52 accelerator, 53 brake, 54 shifter, 60 processing circuit, 61 processor, 62 memory, 51a steering image, 52a accelerator image, 53a brake image, 54a shifter image, 51b notification image, 201 windshield, 202 meter cluster.

The invention claimed is:
1. A vehicle information display control device, comprising:
 a processor to execute a program; and
 a memory to store the program which, when executed by the processor, performs processes of:
 obtaining automatic driving information including information indicating that each actuator of a vehicle is in a manual control mode or an automatic control mode; and
 causing a display to display an image based on the automatic driving information,
 wherein the display includes a first display area and a second display area with different apparent distances from a driver of the vehicle, and the processor causes the display to display an image corresponding to an actuator in the manual control mode on the first display area, and an image corresponding to an actuator in the automatic control mode on the second display area.

2. The vehicle information display control device according to claim 1,
wherein the first display area and the second display area are included in a single display, and
the single display including the first display area and the second display area is a head up display.

3. The vehicle information display control device according to claim 1,
wherein the first display area and the second display area are included in a single display, and
the single display including the first display area and the second display area is a liquid crystal display including a first display surface used as the first display area and a second display surface used as the second display area, the first display surface and the second display surface being overlaid on one another.

4. The vehicle information display control device according to claim 1,
wherein the automatic driving information further includes information indicating whether the actuator in the manual control mode can be switched to the automatic control mode, and
when the actuator in the manual control mode can be switched to the automatic control mode, the processor changes a display mode of the image corresponding to the actuator.

5. The vehicle information display control device according to claim 1,
wherein the automatic driving information further includes information on a distance or a time until switching the actuator in the automatic control mode to the manual control mode is required, and
when the distance or the time until switching the actuator in the automatic control mode to the manual control mode is required is less than or equal to a predetermined threshold, the processor changes a display mode of the image corresponding to the actuator.

6. The vehicle information display control device according to claim 1,
wherein the display includes a head up display,
the automatic driving information further includes information on a distance or a time until switching the actuator in the automatic control mode to the manual control mode is required, and
the processor causes the head up display to display a notification image for notifying the distance or the time until switching the actuator in the automatic control mode to the manual control mode is required, and changes an apparent distance of the notification image from a driver, according to the distance or the time until switching the actuator to the manual control mode is required.

7. The vehicle information display control device according to claim 1,
wherein the display includes a head up display,
the automatic driving information further includes information on a distance or a time until the actuator in the manual control mode can be switched to the automatic control mode, and
the processor causes the head up display to display a notification image for notifying the distance or the time until the actuator in the manual control mode can be switched to the automatic control mode, and changes an apparent distance of the notification image from a driver, according to the distance or the time until the actuator can be switched to the automatic control mode.

8. A method for displaying automatic driving information, the method comprising:
obtaining the automatic driving information including information indicating that each actuator of a vehicle is in a manual control mode or an automatic control mode; and
causing a display to display an image corresponding to an actuator in the manual control mode on a first display area, and an image corresponding to an actuator in the automatic control mode on a second display area,
wherein the first display area and the second display area have different apparent distances from a driver of the vehicle.

* * * * *